(12) United States Patent
Van De Sluis et al.

(10) Patent No.: US 10,595,549 B2
(45) Date of Patent: *Mar. 24, 2020

(54) DISPOSABLE CARTRIDGE FILLED WITH A SINGLE SERVE PORTION OF A LIQUID INGREDIENT TO BE COMBINED WITH A BASE LIQUID FOR THE PREPARATION OF A LIQUID PRODUCT

(71) Applicant: Apiqe Holdings, LLC, Torrance, CA (US)

(72) Inventors: Jasper Jacobus Van De Sluis, Le Utrecht (NL); Roland Waldemar Verbeek, ND Huizen (NL)

(73) Assignee: Apiqe Holdings, LLC, Torrance, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/526,880

(22) PCT Filed: Nov. 17, 2015

(86) PCT No.: PCT/US2015/061126
§ 371 (c)(1),
(2) Date: May 15, 2017

(87) PCT Pub. No.: WO2016/081480
PCT Pub. Date: May 26, 2016

(65) Prior Publication Data
US 2017/0354169 A1     Dec. 14, 2017

(30) Foreign Application Priority Data

Nov. 17, 2014   (NL) ........................................ 2013824
Dec. 9, 2014   (NL) ........................................ 2013947

(51) Int. Cl.
*B65D 85/804*     (2006.01)
*A23L 2/52*     (2006.01)
(Continued)

(52) U.S. Cl.
CPC ................... *A23L 2/52* (2013.01); *A23L 2/54* (2013.01); *A47J 31/3628* (2013.01);
(Continued)

(58) Field of Classification Search
None
See application file for complete search history.

(56) References Cited

U.S. PATENT DOCUMENTS

| | | | |
|---|---|---|---|
| 4,808,346 A | 2/1989 | Strenger | |
| 6,832,542 B2* | 12/2004 | Hu | ...................... A47J 31/0668 99/295 |

(Continued)

FOREIGN PATENT DOCUMENTS

| | | | |
|---|---|---|---|
| WO | WO2005077811 A2 | 8/2005 | |
| WO | WO-2006008243 A1 * | 1/2006 | ......... B65D 85/8043 |
| WO | WO2007114685 A1 | 10/2007 | |
| WO | WO-2011138405 A1 * | 11/2011 | .......... A47J 31/0668 |
| WO | WO2011138405 A1 | 11/2011 | |
| WO | WO2012121597 A1 | 9/2012 | |

OTHER PUBLICATIONS

Definition of "at" 2019 www.dictionary.com (Year: 2019).*
International Search Report and Written Opinion issued in PCT/US2015/061126 dated May 11, 2016.

*Primary Examiner* — Viren A Thakur
(74) *Attorney, Agent, or Firm* — Blank Rome LLP

(57) ABSTRACT

The invention relates to a disposable cartridge filled with a single serve portion of a liquid ingredient to be combined with a base liquid for the preparation of a liquid product, e.g. a beverage concentrate to be combined with water, e.g. carbonated water, for the preparation of a beverage suitable for human consumption. The cartridge comprises a vertically extending channel that extends to a dispensing aperture (Continued)

in the bottom of the cartridge and one or more dispensing passages extending between a reservoir and the outside of the cartridge. The dispensing passages are provided with outlet openings located adjacent the aperture such that the base liquid and the liquid ingredient are dispensed in parallel flows, the liquid ingredient subsequently coating the exterior of the stream of base liquid, such that actual mixing of the liquid ingredient and base liquid only takes place after both have been dispensed.

19 Claims, 11 Drawing Sheets

(51) Int. Cl.
A47J 31/36 (2006.01)
A23L 2/54 (2006.01)
A47J 31/40 (2006.01)
B67D 1/00 (2006.01)

(52) U.S. Cl.
CPC ......... *A47J 31/3695* (2013.01); *A47J 31/407* (2013.01); *B65D 85/804* (2013.01); *B65D 85/8043* (2013.01); *B67D 1/0004* (2013.01); *B67D 1/0078* (2013.01)

(56) References Cited

U.S. PATENT DOCUMENTS

| | | | |
|---|---|---|---|
| 2008/0264267 A1* | 10/2008 | Doglioni Majer | B65D 85/8043 99/295 |
| 2009/0223375 A1* | 9/2009 | Verbeek | A47J 31/405 99/287 |
| 2010/0064898 A1* | 3/2010 | Bongers | B65D 85/8043 99/295 |
| 2010/0159077 A1* | 6/2010 | Skalski | A47J 31/0668 426/80 |
| 2011/0110180 A1* | 5/2011 | Snider | A47J 31/407 366/142 |
| 2013/0129870 A1* | 5/2013 | Novak | B65D 85/73 426/115 |
| 2014/0123859 A1* | 5/2014 | Verbeek | A47J 31/18 99/295 |
| 2014/0331868 A1 | 11/2014 | Novak et al. | |
| 2015/0072052 A1* | 3/2015 | Bartoli | B65D 85/8043 426/112 |
| 2015/0125586 A1 | 5/2015 | Ergican | |
| 2015/0259134 A1* | 9/2015 | Mack | B65D 65/466 426/112 |
| 2015/0329282 A1* | 11/2015 | Bartoli | B65D 85/8043 426/115 |

\* cited by examiner

DISPOSABLE CARTRIDGE FILLED WITH A SINGLE SERVE PORTION OF A LIQUID INGREDIENT TO BE COMBINED WITH A BASE LIQUID FOR THE PREPARATION OF A LIQUID PRODUCT

CROSS-REFERENCE TO RELATED APPLICATIONS

This application is a national phase of PCT/US2015/061126, filed Nov. 17, 2015 which claims benefit to to Dutch Application No. NL 201384 entitled "DISPOSABLE CARTRIDGE FILLED WITH A SINGLE SERVE PORTION OF A LIQUID INGREDIENT TO BE COMBINED WITH A BASE LIQUID FOR THE PREPARATION OF A LIQUID PRODUCT", filed on Nov. 17, 2014, and to Dutch Application No. NL 2013947 entitled "SYSTEM, DISPOSABLE CARTRIDGE, AND METHOD FOR THE PREPARATION OF A LIQUID PRODUCT", filed on Dec. 9, 2014, and assigned to the assigned hereof and hereby expressly incorporated by reference herein.

The present invention relates to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage.

Examples of disposable cartridge based beverage preparation systems are for example disclosed in U.S. Pat. No. 4,808,346, WO2005/077811, WO2007/114685, US2014/0331868, and US2015/0125586.

The present invention aims to provide improvements or at least useful alternatives. For example prior art systems have unsatisfactory results when it comes to the preparation of a carbonated beverage, e.g. in comparison to the same beverage being dispensed from a bottle or can. Also for example the need exists for cartridges that are easy to handle by consumers and/or are attractive in view of mass production and costs.

According to a first aspect thereof the present invention proposes a cartridge for the production of a beverage from a stream of a base liquid, the cartridge defining a flow channel for passage of the stream of base liquid through or along the cartridge and comprising a reservoir for receiving a liquid ingredient, the reservoir comprising at least one dispensing passage through which the ingredient can exit the reservoir and contact the stream of base liquid and a seal for initially closing the dispensing passage, wherein the dispensing passage comprises a throttle region having a relatively smaller flow cross-section and a dispensing passage outlet opening for contact with the stream of base liquid having a relatively larger flow cross-section, the throttle region being between the dispensing passage outlet opening and the reservoir.

The disposable cartridge may be embodied to have the features according to claim 1 or hereinafter described.

The cartridge according to the first aspect of the invention is in particular suited for the preparation of a carbonated beverage, wherein the liquid ingredient flavors and/or colors the stream of carbonated water that flows through the channel in the column.

In this design the carbonated water simply passes through the channel from the inlet to the dispensing aperture and emerges from this dispensing aperture as a stream of carbonated water. As will be explained the flow of the carbonated water is preferably not hindered or disturbed in any manner while passing through the cartridge, preferably the channel forming a rectilinear extension of the duct in the feed lance of similar cross-section. Also the dispensing from the dispensing aperture is preferably not hindered in any way, preferably straight down into a drinking vessel for the consumer without any contact with a portion of the cartridge or of the apparatus. By avoiding disturbances of the carbonated water flow the effect is achieved that the carbon dioxide gas dissolved in the carbonated water is retained therein as much as possible. This is beneficial for the quality of the beverage and also allows for efficient use of carbon dioxide gas, e.g. of importance when the carbon dioxide gas is stored in a gas bottle that needs to be replaced by a consumer when empty.

In this design the liquid ingredient, or syrup as often referred to in the beverage industry, does not enter into the channel through which the carbonated water or other base liquid flows.

Instead the liquid ingredient is dispensed from the one or more dispensing passage outlet openings which are arranged so that the dispensed liquid ingredient merges with the exterior of the stream of carbonated water that emerges from the dispensing aperture.

As the exterior of the stream of carbonated water shows by itself a sort of turbulence due to the expansion and/or escape of some of the dissolved carbon dioxide the merged flow of liquid ingredient is then gradually entrained in the carbonated water stream and becomes mixed therewith very effectively. It has been observed that this causes minimal loss of carbon dioxide from the carbonated water, e.g. in comparison to a design of a cartridge with a mixing chamber where carbonated water and liquid ingredient are made to collide and mix. So in practical terms the process of merging or joining of the liquid ingredient with the stream of dispensed carbonated water takes place directly downstream of the dispensing aperture of the cartridge, the intimate mixing being an autonomous process that effectively takes place whilst the stream travels towards and into the drinking vessel.

Preferably said liquid ingredient streams as an annular shroud around the emerging stream of carbonated water.

Preferably the liquid ingredient emerging from the one or more dispensing passage outlet openings has a direction generally parallel to the stream of base liquid, e.g. carbonated water, emerging from the dispensing aperture, e.g. so as to avoid any undue disturbance of the carbonated water stream.

In this design the premade hole in the bottom sealing film, aligned with the dispensing aperture, e.g. having a diameter the same or similar to said dispensing aperture, avoids the risk of said bottom sealing film, or portion thereof, interfering with the stream of base liquid emerging from the dispensing aperture. As explained, in view of retention of carbon dioxide and/or other gas in the carbonated water, it is desirable to not hinder the stream as any hindrance causes loss of gas from the stream.

Also, in this design, there is no need for the user to remove the bottom sealing film. The cartridge causes the effective opening of the bottom sealing film due to the column being moved to its lower dispensing position.

The top sealing film may extend over the inlet of the channel, but in another design the top sealing film also has a hole that is then aligned with the inlet of the channel.

As is preferred the channel is rectilinear and vertical.

The column is preferably located centrally in the cartridge with the reservoir extending as an annular reservoir around the column. For example the cartridge has a circumferential wall that is generally circular in cross-section, concentrically around the column. It is however not excluded that the column and/or the channel is located off-centre or at one side of the reservoir. It is even possible that the channel is formed externally of the cartridge, whereby the stream of base liquid effectively bypasses the cartridge and the base liquid and the liquid ingredient merge thereafter.

For example the cartridge is provided with an identification representing the liquid ingredient therein, e.g. a barcode or otherwise, allowing a dispensing apparatus to read said identification in order to provide via the feed lance the appropriate base liquid.

In an embodiment the one or more dispensing passage outlet openings are arranged, preferably in a circular arrangement, around the dispensing aperture and the bottom sealing film hermetically seals the at least one or more dispensing passage outlet openings, wherein the bottom sealing film is adapted to rupture and/or to tear away from the dispensing passage outlet openings due to the column being moved downwards to its lower dispensing position, thereby opening the dispensing passage outlet openings. This embodiment allows for the bottom sealing film to directly seal the one or more outlet openings, thereby obviating the need for any further valve or the like to close the dispensing passages. As will be explained herein, in embodiments, such a valve, e.g. in the reservoir external of the column, may be provided in designs where the bottom sealing film is absent or when a further seal is desired.

In an embodiment the portion of the column that projects upwards from the bottom of the cartridge body to the top end of the column is an upper portion of the column, and the column further has a lower foot portion, which foot portion projects downwards from the bottom of the cartridge body to said bottom end of the column, such that the bottom surface of the wall of the column and the dispensing aperture at the bottom end of the column are spaced from the bottom of the cartridge body. This feature allows for an effective opening of the bottom sealing film as the foot portion of the column may be protruded into and through the premade hole in the bottom sealing film as the column is moved to its lower dispensing position. Also this design allows to avoid any desire of the liquid ingredient to adhere to the bottom of the cartridge and stick thereon and/or flow away from the dispensing aperture where the ingredient merges with the stream of base liquid.

In a preferred embodiment the one or more dispensing passages are arranged in the wall of the column, and the dispensing passage outlet openings are provided in a bottom surface of the wall of the column. This design effectively creates a duct or ducts within the thickness of the relevant portion of the column, e.g. within the abovementioned foot portion which is preferred. The dispensing passages may comprises multiple semi-circular cross-section passages, seen in vertical direction, e.g. each associated with one inlet opening, e.g. the one inlet opening having a cross-section that is a fraction of the cross-section of the dispensing passage, e.g. at most half the cross-section.

In another embodiment the one or more dispensing passages are at least partially arranged in the bottom of the cartridge body, wherein the one or more dispensing passage outlet openings are arranged in the bottom of the cartridge body, adjacent to a foot portion of the column, preferably in a circular arrangement around the foot portion of the column, so that liquid ingredient emerging from said one or more dispensing passage outlet openings contacts an outside surface of the wall of the foot portion of the column, and flows over the outside surface of the wall of the column to merge with a base liquid stream emerging from the dispensing aperture at the bottom end of the column. Therefore, instead of flowing through passages within the thickness of the wall, the liquid ingredient flows along an outside surface until it reaches the lower end thereof and then merges with the base liquid stream emerging from the dispensing aperture.

In another embodiment the one or more dispensing passages are arranged in the wall of the column, wherein the dispensing passage outlet openings are provided in an outside surface of the wall of a foot portion of the column, between the bottom of the cartridge body and the bottom end of the column, so that liquid ingredient emerging from said one or more dispensing passage outlet openings flows over the outside surface of the wall of the column to merge with a base liquid stream emerging from the dispensing aperture at the bottom end of the column.

In another embodiment the foot portion of the column has a first portion adjacent the bottom of the cartridge body with a first diameter and an adjoining second portion with a second diameter smaller than said first diameter, which first and second foot portion are separated by a shoulder, wherein the one or more dispensing passages are arranged in the wall of the column, and wherein the dispensing passage outlet openings are provided in the shoulder, so that liquid ingredient emerging from said one or more dispensing passage outlet openings flows over the outside surface of the wall of the lower foot portion to merge with a base liquid stream emerging from the dispensing aperture at the bottom end of the column.

In an embodiment one or more discharge grooves are provided in an outside surface of a foot portion of the column for guiding the liquid ingredient that emerged from the one or more discharge outlet openings, each discharge groove extending from one or more dispensing passage outlet openings towards the bottom end of the column, preferably up to the end face of the foot portion of the column. The one or more grooves may serve to distribute the flow of liquid ingredient, e.g. to form the mentioned shroud of the liquid ingredient around the stream of base liquid emerging from the dispensing aperture. The one or more grooves may also be structured to slowdown the liquid ingredient as it emerges from the one or more outlet openings and/or to direct said flow to a flow that is substantially parallel, e.g. vertical, to the emerging stream of base liquid.

In an embodiment which is aimed to create a well-directed stream of base liquid that merges and then mixes autonomously with the liquid ingredient the bottom surface of the wall of the column extends perpendicular to a central axis of the channel.

In an embodiment the one or more outlet openings of the one or more dispensing passages are arranged to dispense the liquid ingredient as an annular shroud around the exterior of the stream of base liquid.

In an embodiment the bottom sealing film has an inner loop shaped sealing area, which is sealed around the dispensing aperture, and an outer loop shaped sealing area, which is sealed to the cartridge body remote from the one or more dispensing passage outlet openings, e.g. to a non-flexible part of the bottom of the cartridge. It is then envisaged that the inner loop shaped area will release upon motion of the column to its lower dispensing position, whereas the outer loop shaped area remains fixed to the cartridge. Preferably a foot portion of the column is effectively pushed into and through the premade hole in the bottom sealing film, preferably without the bottom sealing film being torn, when the column is moved into its dispensing position.

In an embodiment the top sealing film is openable, e.g. pierceable or otherwise, so as to allow for introduction of a pressurized gas into the reservoir in order to pressurize the liquid ingredient therein so as to assist dispensing thereof via the one or more dispensing passages. The gas may be introduced in any appropriate way, e.g. by means of a cannula or gas passage or by pressurizing a sealed chamber communicating with the cartridge and the reservoir.

In an embodiment the cartridge body comprises one or more top sealing film piercing members which are arranged in the reservoir underneath the top sealing film, which seal piercing members have a cutting top positioned near the top seal for, when the top sealing film is moved downwards, for example due to the column being moved downwards from its initial position to its lower dispensing position, engaging the top sealing film and locally rupture the top sealing film thereby providing one or more holes that allow for introduction of pressurized gas into the reservoir. This design avoids the need for any piercing of the top sealing film by a tool or member of the dispensing apparatus, which tool or member would then be prone to some contamination as liquid ingredient may or will stick to the underside of the top sealing film. Also any such tool or member would complicate the design of the dispensing apparatus and/or might be objectionable as being sharp or pointed in view of contact therewith by the consumer.

In an alternative embodiment for creating one or more gas pressure introduction openings in the top sealing film, or in combination with one or more of said internal piercing members, the top sealing film is provided with one or more premade score lines that rupture upon motion of the column to the lower dispensing position. This motion causes, as the top sealing film is secured to the top of the column as well as around an outer perimeter thereof, a stretching of the top sealing film. The score lines cause stresses that are too high and thus the film will then rupture. This rupturing may be assisted by the presence of one or more piercing members underneath the top sealing film.

In an embodiment a top seal piercing member of the cartridge has a bottom end integral with the bottom of the cartridge and a body extending from the bottom upwards through the reservoir to the cutting top located near the top seal, and optionally has a side that is integral with a circumferential wall.

In an embodiment the combined area or cross-section of the one or more dispensing passage outlet openings is multiple times larger than the combined area of the one or more dispensing passage inlet openings, e.g. at least 10 times larger. This embodiment of the dispensing passage outlets is of particular advantage when the dispensing apparatus that is used in conjunction with the cartridge is adapted to exert an expulsion force on the liquid ingredient in the reservoir, e.g. a gas pressure on the liquid ingredient in the reservoir. The relatively narrow inlet openings than act as a throttle for the liquid ingredient which allows to create a stable flow rate into the one or more dispensing passages on the basis of the expulsion force. The larger size of the outlet openings of the same dispensing passage(s) then allows for a slowdown or retarding of the liquid ingredient before it finally emerges from the outlet opening. It will thus be understood that the throttle region may be located at the inlet of the dispensing passage or passages but that it may also be defined at an intermediate position to the extent that it is upstream of the dispensing passage outlet opening or openings.

In an embodiment the one or more dispensing passages are provided with a flow restriction, preferably a fixed or constant flow restriction formed as a portion of the dispensing passage, e.g. in the form of one or more narrow inlet openings, for example the combined inlet openings or other flow restriction portions having a cross section of at most 8 mm2. For example one or more inlet openings have a cross section of between 1 and 2 mm2 each. It will be appreciated that depending on the viscosity of the liquid ingredient to be dispensed from the reservoir the flow restriction can be tailored upon manufacturing of the cartridge.

In an embodiment a dispensing passage inlet opening is oriented at an angle relative to an adjoining section of the dispensing passage such that a jet of liquid ingredient passing through the inlet opening, e.g. embodied as a flow restriction of the passages, collides against a wall portion of the passage thereby reducing, preferably annihilating, the speed of said jet.

In an embodiment the one or more dispensing passages are provided with a relatively narrow inflow section and a relatively wide outflow section, such that the narrow inflow section forms a restriction for a flow of liquid ingredient that flows from the reservoir to the dispensing passage outlet openings. The wide outflow section then allows for a slowdown of the liquid ingredient before it emerges from the outlet opening(s). In an embodiment the outflow section extends substantially parallel to the channel in the column and the inlet section extends at an angle to the outflow section, such that a jet of liquid ingredient passing through the inlet opening, e.g. due to gas pressurization of the liquid ingredient, collides against a wall portion of the outflow section, thereby reducing, preferably annihilating, the speed of said jet.

In an embodiment the top sealing film is provided with a premade hole that is aligned with the inlet of the channel. In another embodiment the top sealing film covers and seals the inlet of the channel in the column. It is then envisaged that the base liquid feed lance can pierce through said top sealing film to feed base liquid to said inlet of the channel.

In an embodiment the channel in the column has an upper portion with a first diameter and an adjoining lower portion extending to said dispensing aperture, said lower portion and dispensing aperture having a second diameter, wherein the first diameter is greater than said second diameter. This stepped diameter of the channel allows to introduce a front end of the feed lance into the wider upper portion, wherein, preferably the duct within the feed lance has an inner diameter that substantially corresponds to the second diameter. In this manner approximately a constant diameter ducts is created for the base liquid, e.g. carbonated water, through the feed lance and the adjoining portion of the channel in the cartridge. This avoids or at least reduces undue disturbance of the flow, which in the event of carbonated water would result in an extra loss of carbon dioxide gas from the water.

In an embodiment the dispensing aperture of the channel of the column, preferably also the adjoining second portion of the channel, has a diameter between 5 and 20 millimeter, e.g. between 8 and 16 mm, e.g. about 10 millimeter.

In an embodiment the cartridge body has a circumferential wall having an upper rim bounding an opening, wherein the top sealing film is fixed to said upper rim, e.g. the rim being embodied as an outwardly projecting flange, e.g. said radially projecting flange being embodied to support the cartridge on a bearing surface of a dispensing apparatus, e.g. on a drawer of such apparatus.

In an embodiment the cartridge body has a circumferential wall around the perimeter of the bottom, wherein the channel is concentric relative to an axis of the circumferential wall of the cartridge. In other embodiments the column is offset from the center of the cartridge, e.g. adjacent one side of the circumferential wall.

In an embodiment the cartridge body comprises an injection molded monolithic plastic body part, the monolithic plastic body part at least comprising a circumferential wall, a bottom, and a portion of the column, e.g. a foot portion of the column and possibly also a lower part of the upper portion of the column, e.g. the part defining the above-mentioned second diameter, wherein, in an embodiment, the remainder of the column is embodied as a separately molded plastic part that is fitted onto the lower part of the upper portion of the column. The latter embodiment may e.g. be advantageous in view of injection molding technology, as it allows for simplification of the mold for the monolithic plastic body part.

In an embodiment a valve member is arranged within the reservoir of the cartridge and outside of the column, which valve member is stationary arranged within the cartridge so as to be movable, e.g. slideable, relative to the column when the column is moved from its higher initial position to its lower dispensing position, wherein—in the higher initial position of the column—the valve member closes the one or more dispensing passages, such that the reservoir is closed, and wherein—in the lower dispensing position of the column—the valve member has moved away from the one or more dispensing passages, such that the reservoir is opened. This embodiment affords a closing of the reservoir right at the inlet of the one or more dispensing passages.

The present invention further relates to a system for the preparation of a liquid product, e.g. a liquid food product, e.g. a beverage, which system comprises:

a) a disposable cartridge filled with a single serve portion of a liquid ingredient as described herein, b) a dispensing apparatus, e.g. a beverage dispensing apparatus, the apparatus being at least provided with:
  a holder for accommodating and retaining the disposable cartridge at a dispensing location in the device,
  a base liquid feed assembly with a base liquid feed lance disposed at the dispensing location, which lance is embodied to connect to the channel of the column of the disposable cartridge, e.g. whilst piercing through the top sealing film of the cartridge, so that base liquid can be fed into the channel,
  an operable displacement device which is adapted to produce a movement of the holder for the cartridge and the base liquid feed lance relative to each other, so that when the displacement device is operated the lance connects to the column, moves the column down relative to the top of the cartridge body, and thereby causes the bottom sealing film to rupture and/or tear away from dispensing aperture, thereby allowing dispensing of the liquid ingredient from the one or more passage outlet openings, and wherein the base liquid feed assembly is adapted to feed base liquid into said channel, which base liquid emerges as a stream from the dispensing aperture, said liquid ingredient dispensed from the one or more passage outlet openings merging with an exterior of said base liquid stream.

In an embodiment the dispensing apparatus further comprises:
  a pressurized gas source, preferably a pressurized air source, e.g. an air pump,
  a pressurization dome member having annular gas seal that is adapted to sealingly engage the top of the cartridge, e.g. the top sealing film, e.g. at or near an upper rim of the circumferential wall of the disposable cartridge, and
  wherein the system is adapted to open, e.g. pierce, break, rupture and/or tear away at least part of the top sealing film, and
  wherein the pressurized gas source is connected to the pressurization dome member so as to allow feeding of pressurized gas beneath said dome member when the gas seal thereof sealingly engages the top of the disposable cartridge and the top sealing film has been opened, to allow entry of pressurized gas into the reservoir to pressurize said liquid ingredient therein to thereby assist the dispensing thereof from the reservoir via the one or more dispensing passages.

In an embodiment the disposable cartridge is embodied with one or more piercing members, so that—due to the column being moved downwards from its initial position to its lower dispensing position—the one or more top sealing film piercing members arranged in the reservoir underneath the top sealing film engage the top sealing film and locally rupture the top sealing film thereby providing one or more holes that allow for introduction of the pressurized gas into the reservoir.

In an embodiment the top sealing film is provided with one or more premade score lines, e.g. by laser machining the top sealing film, and wherein said one or more premade score lines are adapted to rupture and thereby open the top sealing film due to the column being moved downwards from its initial position to its lower dispensing position.

In an embodiment the dispensing apparatus comprises a connection to a water mains or other water supply, a water chiller and a holding tank for chilled water, a carbonator device connected to a source of carbon dioxide gas, e.g. to a bottle of carbon dioxide gas, e.g. an inline carbonator adapted to dissolve carbon dioxide gas into a stream of chilled water that flows through a water duct from said chilled water holding tank to said base liquid feed lance as a single serving is prepared.

In an embodiment the liquid feed assembly is equipped to feed water as the base liquid, e.g. carbonated water, e.g. selectively carbonated and non-carbonated water, e.g. chilled, non-chilled, and/or hot non-carbonated water.

In an embodiment the dispensing apparatus comprises:
  a frame,
  a cartridge holder, e.g. a drawer, adapted to hold the cartridge in a dispensing location relative to the frame of the apparatus,
  wherein the operable displacement device is adapted to produce a movement of the base liquid feed lance relative to frame, e.g. a vertical up and down motion, wherein the base liquid feed lance is integrated with the pressurization dome member having said annular gas seal so as to move in unison.

In an embodiment a first flexible hose connects to the liquid feed lance and a second flexible hose connects to the pressurization dome member.

In an embodiment the holder for the cartridge is equipped to accommodate and retain the cartridge in a substantially horizontal position with the bottom downwards, the holder having an aperture below the bottom of the cartridge in such a way that during dispensing of the liquid product said product remains clear of the holder.

The present invention also relates to a method for preparation of a liquid product, e.g. a carbonated beverage, wherein use is made of a cartridge and/or system and/or apparatus as defined herein or in the accompanying claims.

The invention furthermore provides a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body, e.g. molded plastic body, with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a column having a portion that projects upwards from the bottom to an upper side of the column, wherein a vertically extending channel extends through the column from an inlet at a top end thereof to an aperture in the bottom of the cartridge body, wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position, wherein a valve member is arranged within the cartridge and outside of the column, which valve member is stationary arranged within the cartridge so as to be movable, e.g. slidable, relative to the column when the column is moved from its higher initial position to its lower dispensing position, wherein the cartridge body is provided with one or more dispensing passages arranged to dispense the liquid ingredient from the reservoir, wherein—in the higher initial position of the column—the valve member closes the one or more dispensing passages, such that the reservoir is closed, and wherein—in the lower dispensing position of the column—the valve member has moved away from the one or more dispensing passages, such that the reservoir is opened, and wherein a base liquid feed lance is connectable to the inlet of the channel in the column, so that the base liquid can be fed into the channel and exit the cartridge via the aperture in the bottom of the cartridge, wherein, preferably, said one or more dispensing passages are arranged such that the dispensed liquid ingredient is combined with the base liquid within the channel or at or near the outlet of the channel.

In an embodiment of a cartridge according to the invention, the valve member arranged within the cartridge is combined with a bottom sealing film adapted to rupture and/or to tear away from the dispensing passage outlet openings due to the column being moved downwards to its lower dispensing position, thereby opening the dispensing passage outlet openings.

It will be appreciated by the skilled person that a technical feature discussed herein as required or as optional with respect to one embodiment of the invention may be equally applicable to one or more other embodiments described herein, with the feature performing its designation function. Such combinations are all envisaged herein unless a combination would result in a technical impossible solution and/or not meet the desired functionality.

In this description, according to a preferred application of the invention, the liquid ingredient is a beverage concentrate that is to be combined with a flow of carbonated water to fill a single serve container, e.g. a drinking glass, with a single serving of a carbonated beverage.

In an embodiment the device also, or alternatively, is embodied to combine the liquid ingredient with non-carbonated water, e.g. hot or cold non-carbonated water. Generally carbonated water will be cold water.

Whilst use in the field of preparation of carbonated beverages is envisaged it will be clear that the inventive cartridge and/or apparatus can also be employed for the preparation of other liquid products, e.g. in the pharmaceutical field, etc.

According to a first aspect thereof the present invention provides a disposable cartridge filled with a single serve portion of a liquid ingredient to be combined with a base liquid for the preparation of a liquid product, e.g. a liquid food product suitable for human consumption. The present invention further relates to a system for the preparation of a liquid product, e.g. a liquid food product, e.g. a beverage.

Figure 1:
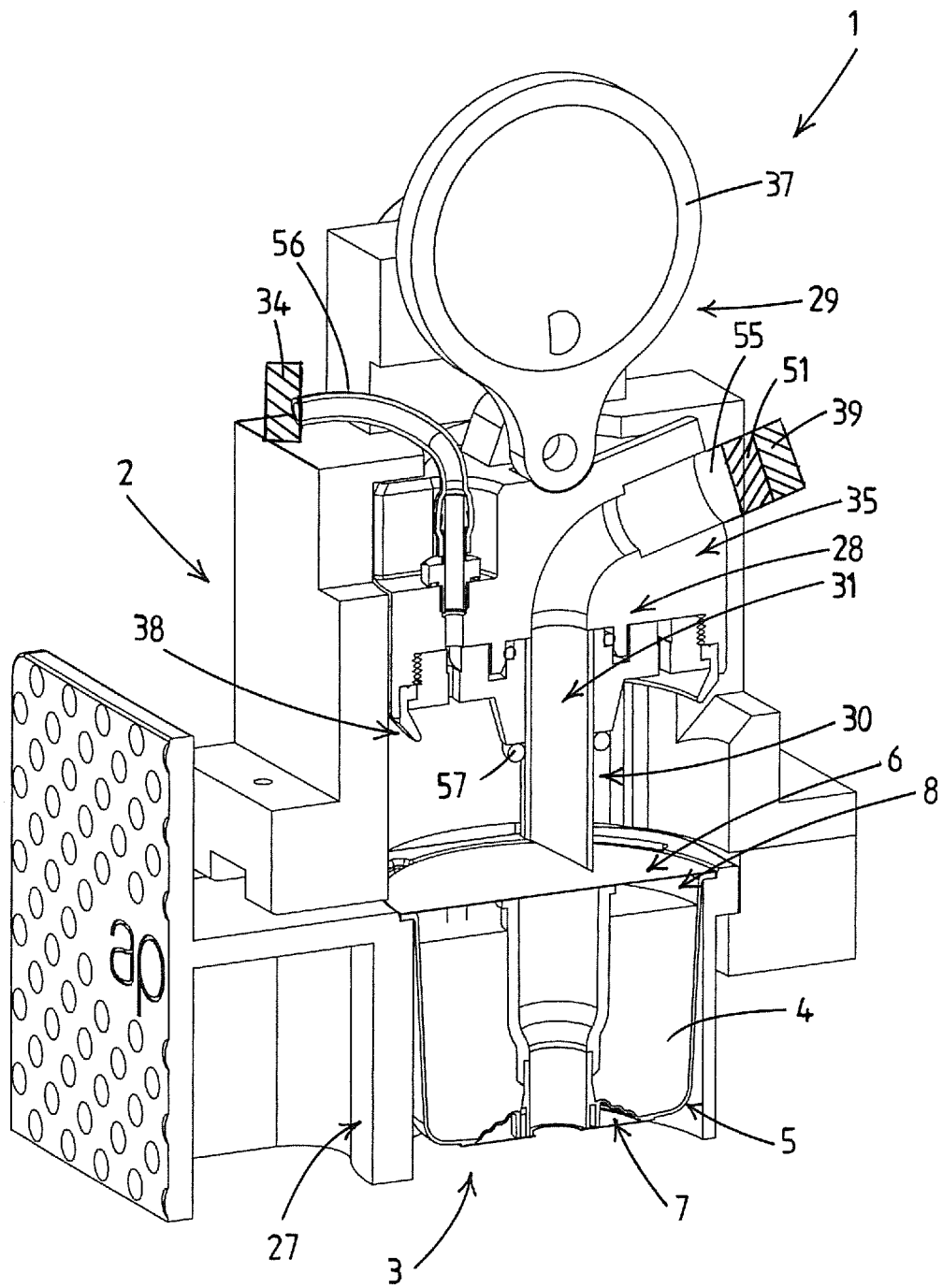
FIG. 1 shows a perspective cross-sectional view of an example of a system according to the invention, the system comprising a dispensing apparatus, part of which is shown, and a disposable cartridge with a single serve portion of a liquid ingredient, e.g. a beverage concentrate, to be combined with a base liquid for the preparation of a liquid product.
Figure 11:
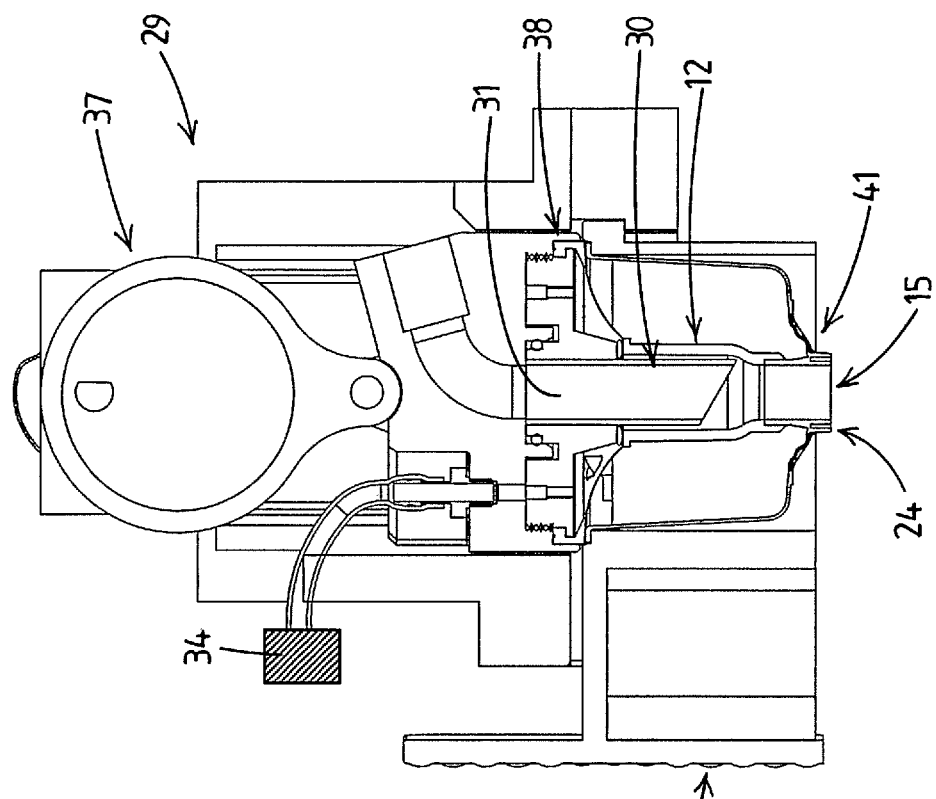
FIG. 11 shows a cross sectional side view of the system of FIG. 1, during a dispensing cycle.
Figure 10:
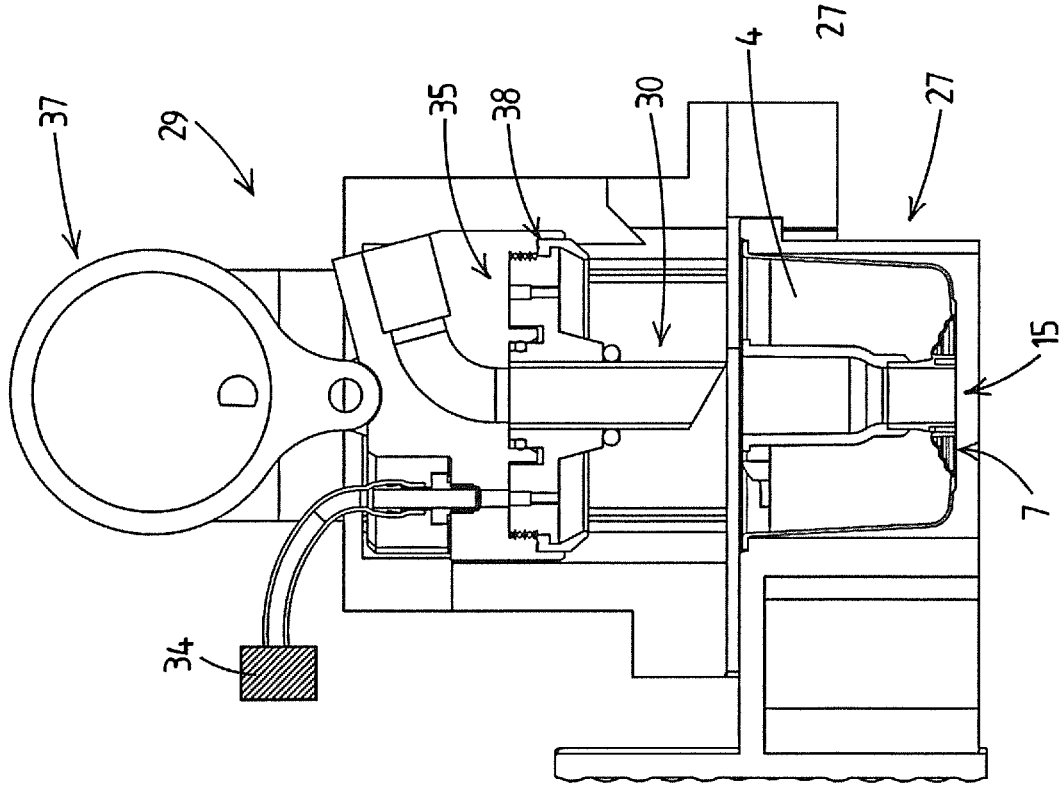
FIG. 10 shows a cross sectional side view of the system of FIG. 1, prior to the start of a dispensing cycle.
Figure 18:
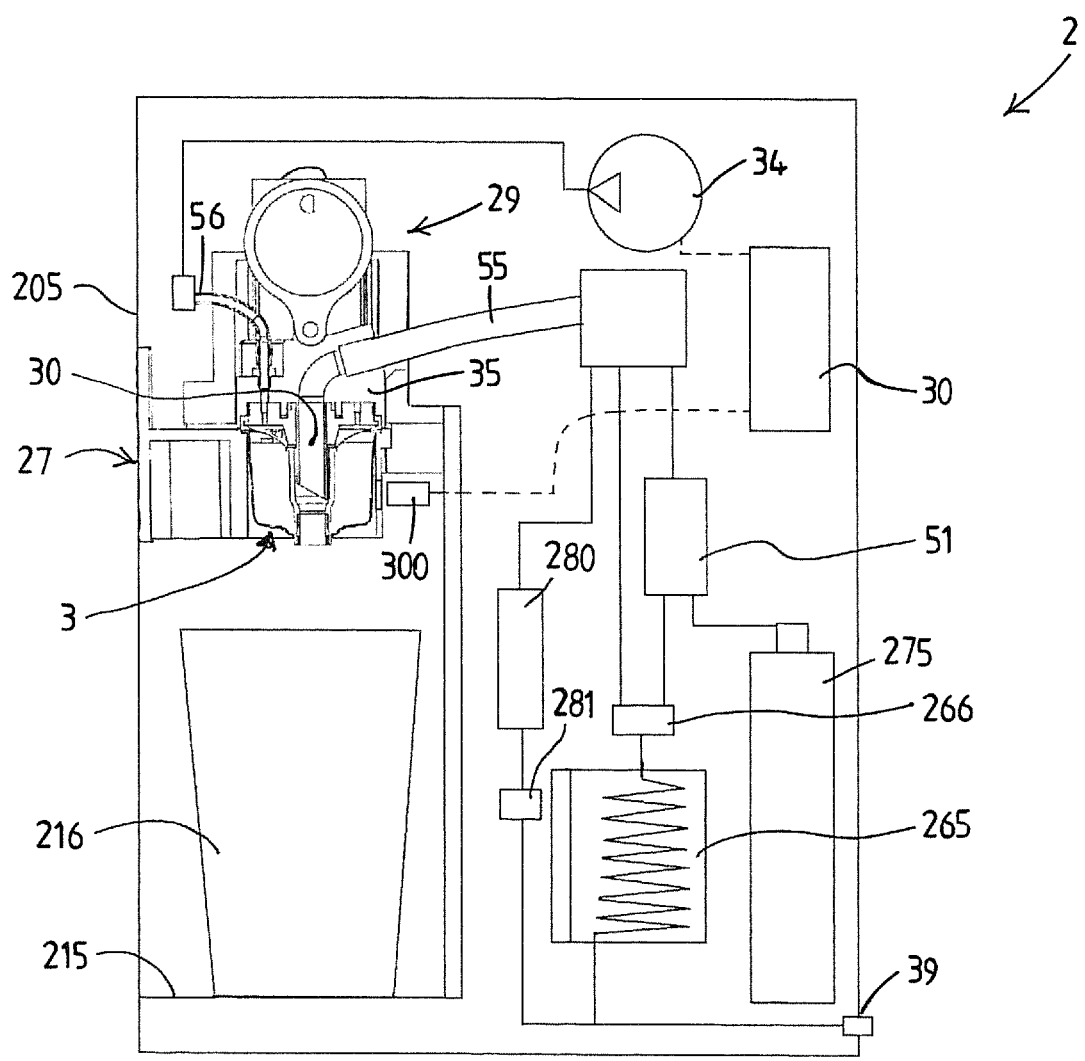
FIG. 18 schematically shows the beverage dispensing apparatus and cartridge of FIG. 1.

FIG. 1 shows a perspective cross-sectional view of an example of a system 1 for the preparation of a liquid product, e.g. a liquid food product, e.g. a beverage, according to the invention. The system comprises a dispensing apparatus, e.g. a beverage dispensing apparatus, 2 and a disposable cartridge 3. In FIGS. 1, 10 and 11 only part of the dispensing apparatus 2 is shown. FIG. 18 schematically shows the beverage dispensing apparatus 2, comprising the part shown in FIGS. 1, 10 and 11, and cartridge of FIG. 1.

The system is configured to combine a single serve portion of a liquid ingredient 4, e.g. a beverage concentrate, held in the disposable cartridge 3 with a base liquid provided by the apparatus 2, to thus prepare the liquid product. In FIG. 1 the system is shown prior to the start of a dispensing cycle.

Here below, first the disposable cartridge will be discussed in more detail, than the dispensing apparatus and the system.

Figure 2:
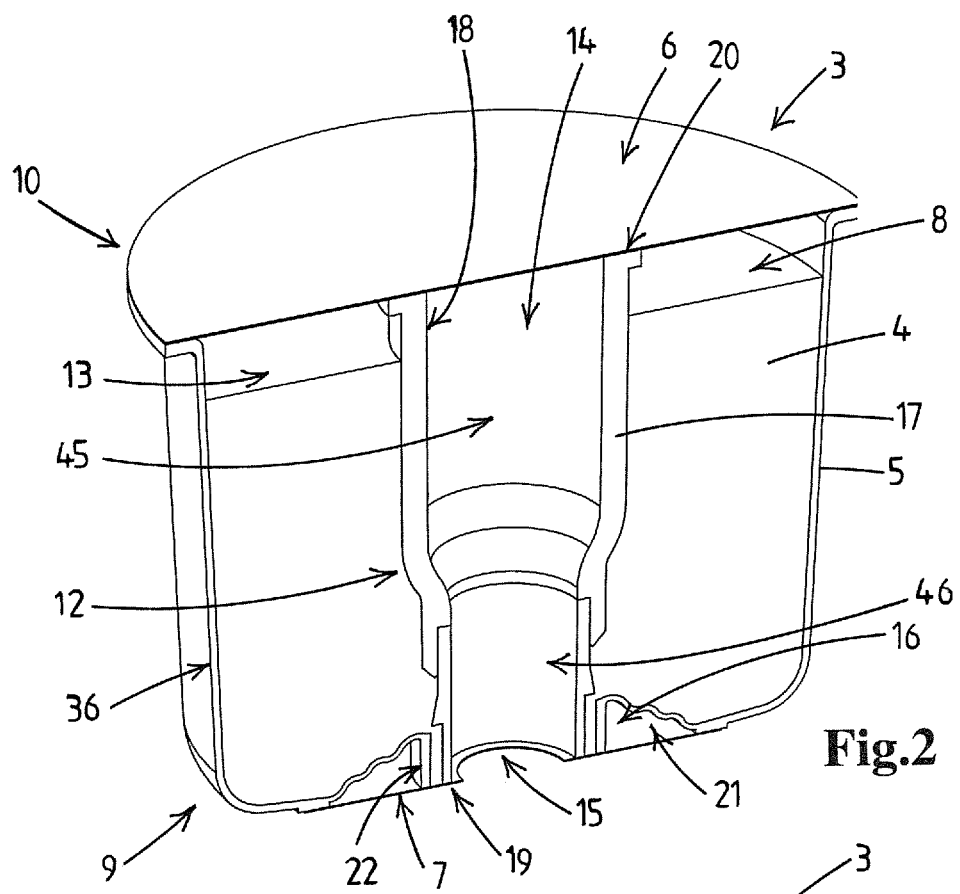
FIG. 2 shows a cross sectional view of the cartridge of FIG. 1.
Figure 4:
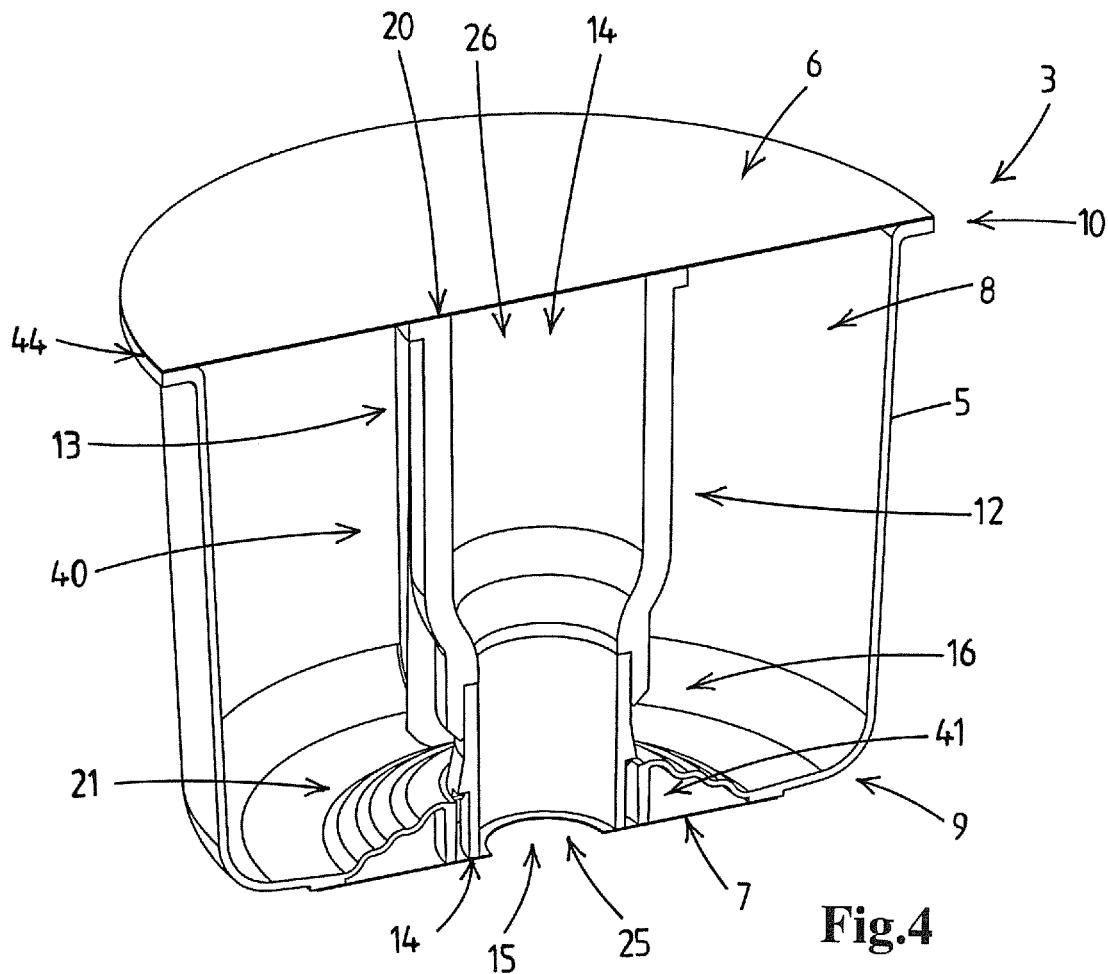
FIG. 4 shows in cross sectional view of the cartridge of FIG. 1 without liquid ingredient.
Figure 5:
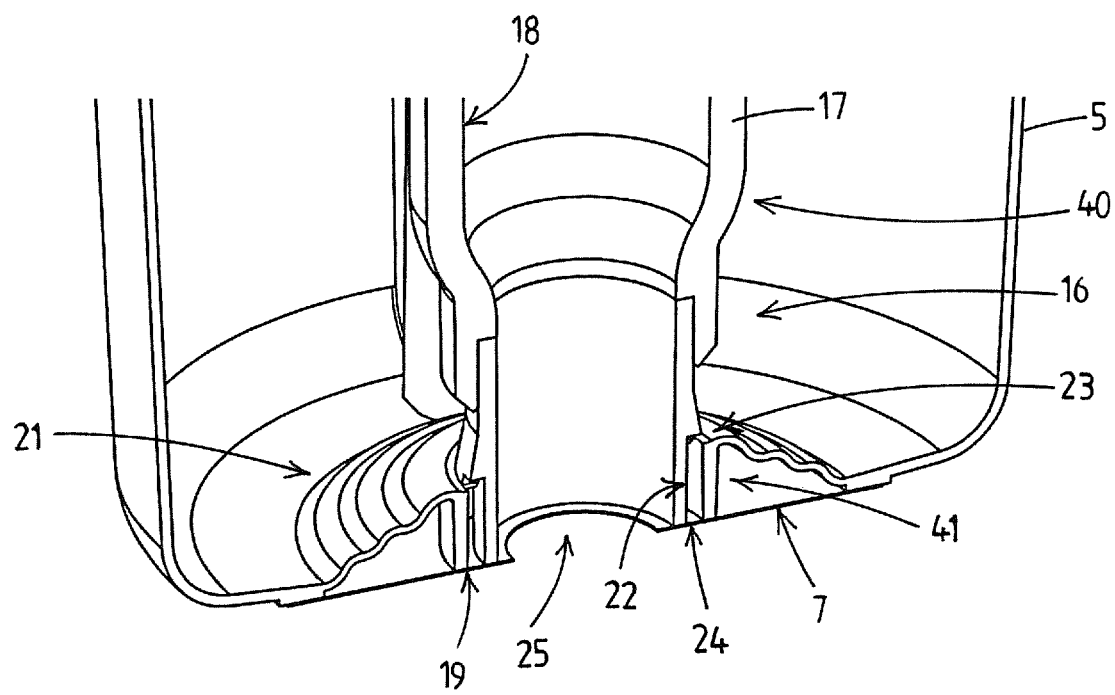
FIG. 5 shows a partial close up of a cross sectional view of the cartridge of FIG. 4.
Figure 8:
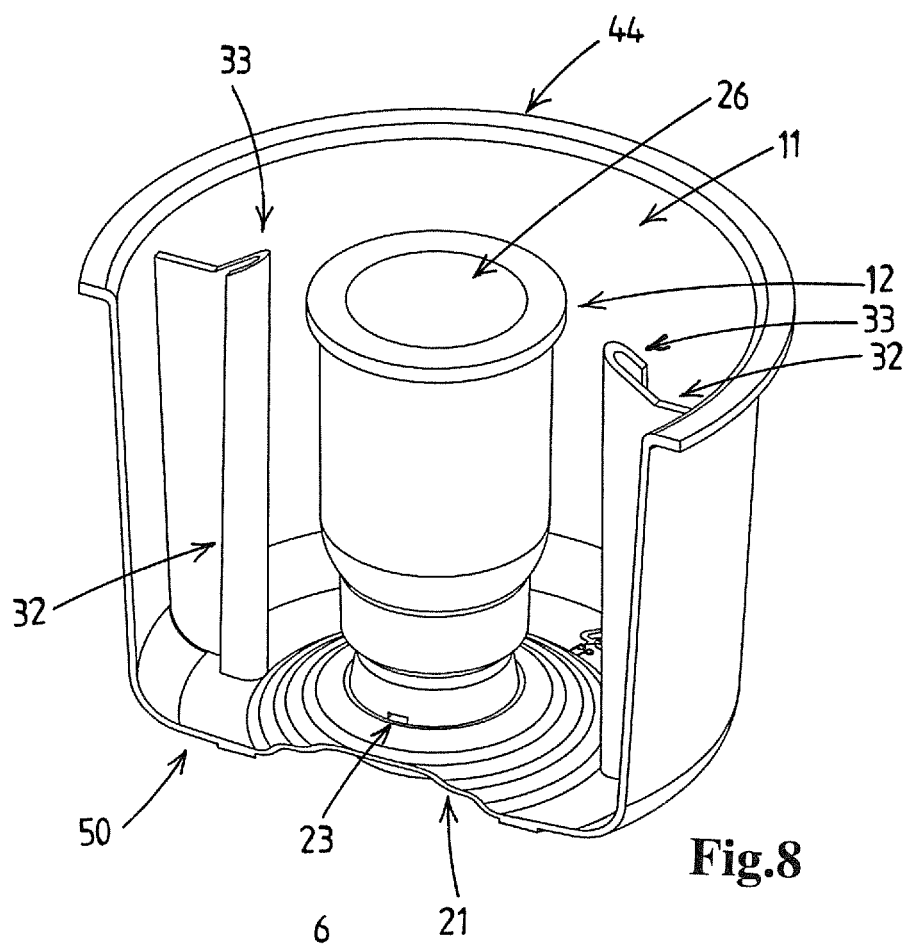
FIG. 8 shows a cross sectional view of the cartridge of FIG. 4, without a top seal and a bottom seal.

The disposable cartridge 3, shown in cross section in FIG. 2, is filled with a single serve portion of a liquid ingredient 4, e.g. a beverage concentrate to be combined with water, e.g. carbonated water, for the preparation of a beverage. FIGS. 4, 5 and 8 show cross sectional views of the same disposable cartridge without the liquid ingredient.

The disposable cartridge 3 comprises a cartridge body 5, a top sealing film 6 and a bottom sealing film 7. The cartridge body 5 delimits a reservoir 8 that, in FIG. 2 is filled with the single serve portion of a liquid ingredient 4. The cartridge body 5 has a bottom 9 and a top 10. The top 10 has an aperture 11 in communication with the reservoir 8, which aperture is hermetically sealed by a top sealing film 6.

The cartridge body 5 further comprises a column 12 having a portion that projects upwards from the bottom 9 of the cartridge body 5 to a top end 13 of the column 12.

A channel 14 extends through the column 12 from an inlet 26 at said top end of the column to a dispensing aperture 15 at a bottom end 16 of the column 12, which dispensing aperture is located at the side of the bottom 9 of the cartridge body 5.

The column 12 has a wall 17 having an inside surface 18 that delimits the channel 14, a bottom surface 19 at the bottom end 16 of the column and a top surface 20 at the top end 13 of the column. The top sealing film 6 is sealed to said top end 13 of the column 12.

A base liquid feed lance 30 of the dispensing apparatus 2 is connectable to the inlet of the channel 14 in the column 12, allowing to feed base liquid into the channel and to dispense a stream of base liquid via the dispensing aperture 15, said stream having an exterior.

Figure 6:
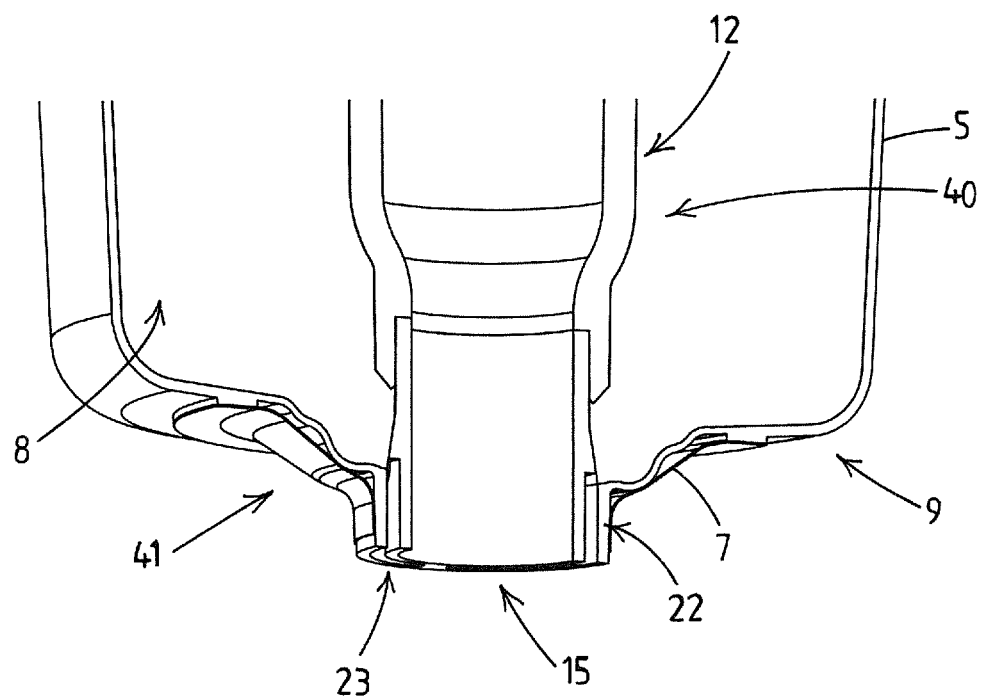
FIG. 6 shows a partial close up of a cross sectional view of the cartridge of FIG. 1, with a column in a dispensing position.

The bottom 9 of the cartridge body 5 has a flexible portion 21 adjacent, e.g. around, the column 12, such that the column is movable downwards by a force exerted thereon relative to the top 10 of the cartridge body, e.g. to an upper edge of a circumferential wall of the cartridge body, between a higher initial position, shown for example in FIGS. 2 and 4, and a lower dispensing position, shown in FIG. 6.

According to the invention, the cartridge body 5 is furthermore provided with one or more dispensing passages, in the embodiment shown with two dispensing passage 22, adapted to dispense the liquid ingredient 4 from the reservoir 8. In the embodiment shown, the dispensing passages 22 each have one dispensing passage inlet opening 23 arranged so that liquid ingredient in the reservoir 8 can enter the one or more dispensing passages 22, and one dispensing passage outlet opening 24. The dispensing passage outlet openings 24 are arranged so that the flow of liquid ingredient 54 emerging therefrom merges with an exterior of a base liquid stream 53 that is dispensed from the dispensing aperture 15 at the bottom end 16 of the column 12, see FIG. 12.

It is noted that in an alternative embodiment, dispensing passages may be provided with multiple inlet openings and/or with multiple outlet openings and/or dispensing passages may share inlet openings and/or outlet openings.

The disposable cartridge 3 has a bottom sealing film 7 provided with a hole 25, and is placed against, i.e. along the side of, the bottom of the cartridge body such that the hole of the sealing film is aligned with the dispensing aperture 15 of the column 12. The bottom sealing film 7 is sealed to the cartridge body 5 at the column 12 and at one or more locations remote from the column 12.

In the embodiment shown, the bottom sealing film 7 has an inner loop shaped sealing area, which is sealed to the bottom end 6 of the column 8, around the dispensing aperture 15, and an outer loop shaped sealing area, which is sealed to the cartridge body 5 remote from the dispensing passage outlet openings 24, to a non-flexible part 50 of the bottom of the cartridge 9.

According to the invention, the bottom sealing film 7 will rupture and/or to tear away from the dispensing aperture 15 due to the column 12 being moved downwards to its lower dispensing position, thereby allowing dispensing from the passage outlet openings 24.

Figure 7:
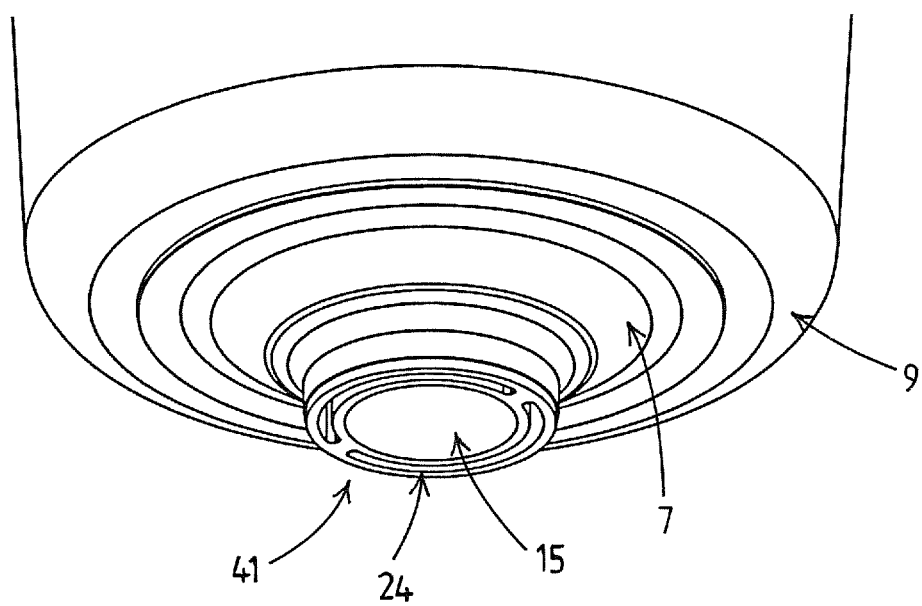
FIG. 7 shows a partial close up of a perspective bottom view of the cartridge of FIG. 1, with a column in a dispensing position.

In the embodiment shown, the inner loop shaped area will release upon motion of the column to its lower dispensing position, whereas the outer loop shaped area remains fixed to the cartridge. FIG. 5 shows the disposable cartridge with the column 12 in its higher initial positions and the bottom sealing film 7 sealing of the dispensing passage outlet openings 24. FIGS. 6 and 7 show the disposable cartridge with the column 12 in its lower dispensing position and with the bottom sealing film torn away from the dispensing aperture 15 and the dispensing passage outlet openings 24, thereby allowing the liquid ingredient to be dispensed via the dispensing passages.

The bottom sealing film 7 has a hole that corresponds to the dispensing aperture or outlet 15 from which the base liquid stream emerges from the cartridge. This design, e.g. like a disc with a central hole therein as shape of the bottom sealing film, avoids that after rupture of the bottom sealing film, any flaps of the ruptured film interfere with the flow of base liquid. As will be appreciate such interference would be detrimental for the carbon dioxide retention in the emitted base liquid stream.

In an embodiment the bottom sealing film is provided with one or more premade score lines, e.g. by laser machining the top sealing film, which one or more premade score lines are adapted to rupture and thereby open the sealing film due to the seal being stretched, for example by the feed lance moving the column downwards from its initial position to its lower dispensing position.

Providing the bottom seal with a hole that corresponds to the dispensing aperture 15 of the cartridge 3 also allows for an embodiment in which the bottom seal is configured to stretch such that the part of the column, or at least the part of the column with the dispensing passage outlet openings, can pass through it to free the dispensing passage outlet openings and allow for the liquid ingredient to be dispensed via the dispensing passages, as is shown in FIG. 7. In such an embodiment, the bottom sealing film is mainly stretched and tearing of the seal may be little or even not present.

The cartridge 3 is in particular suited for the preparation of a carbonated beverage, wherein the liquid ingredient 4 flavors and/or colors a stream of carbonated water that is dispensed via the channel 14 in the column 12. The design of the disposable cartridge 3 allows for carbonated water to simply pass through the channel 14, from the inlet 26 to the dispensing aperture 12 and emerge from this dispensing aperture as a stream of carbonated water.

Figure 12:
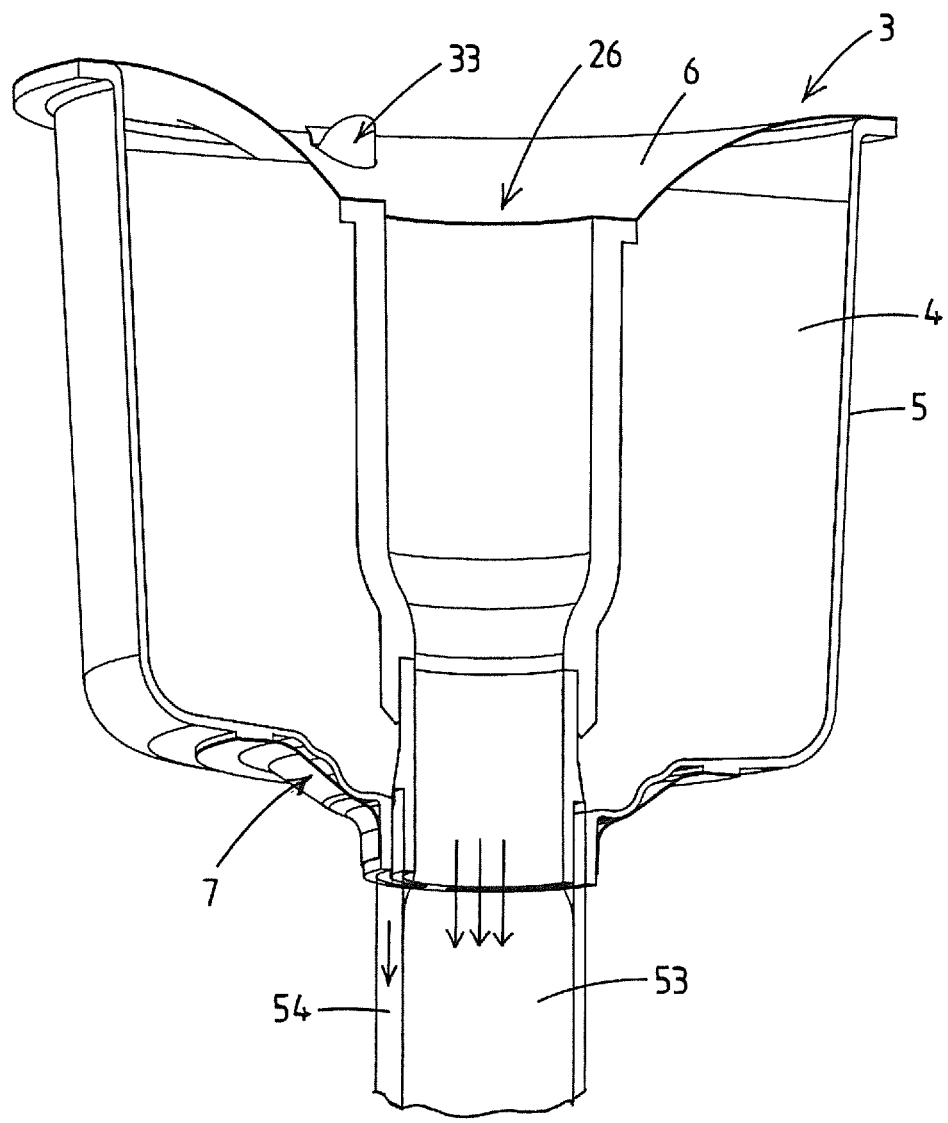
FIG. 12 shows a perspective cross sectional view of the cartridge of FIG. 1, with a supply flow of water, e.g. carbonated water, via a channel in the column in the dispensing position and with a flow of liquid ingredient from outlet openings.

During a dispensing cycle, the liquid ingredient 4 is dispensed from the reservoir 8 via the dispensing passages 22, of which the outlet openings 24 are arranged so that the dispensed liquid ingredient 54 merges with the exterior of the stream of carbonated water 53 after that stream has emerged from the dispensing aperture 15 at the bottom side of the cartridge, see FIG. 12. Thus, the flow of liquid ingredient is added to the flow of carbonated water without disturbing that flow. By avoiding disturbances of the carbonated water flow the effect is achieved that the carbon dioxide gas dissolved in the carbonated water is retained therein as much as possible. This is beneficial for the quality of the beverage and also allows for efficient use of carbon dioxide gas, e.g. of importance when the carbon dioxide gas is stored in a gas bottle that needs to be replaced by a consumer when empty.

It is noted that the exterior of the stream of carbonated water shows by itself a sort of turbulence due to the expansion and/or escape of some of the dissolved carbon dioxide. Thus, the merged flow of liquid ingredient is then gradually entrained in the carbonated water stream and becomes mixed therewith very effectively. It has been observed that this causes minimal loss of carbon dioxide from the carbonated water, e.g. in comparison to a design of a cartridge with a mixing chamber where carbonated water and liquid ingredient are made to collide and mix. So in practical terms the process of merging or joining of the liquid ingredient with the stream of dispensed carbonated water takes place directly downstream of the dispensing aperture of the cartridge, the intimate mixing being an autonomous process that effectively takes place whilst the stream travels towards and into the drinking vessel.

FIGS. 1, 10 and 11 show the system 1 with the disposable cartridge 3 at a dispensing location in the dispensing apparatus 2.

The dispensing apparatus 2 comprises a base liquid feed assembly 28 that is adapted to feed base liquid into the channel 14 of the disposable cartridge 3. The base liquid feed assembly 28 has a base liquid feed lance 30 disposed at the dispensing location. The lance 30 is embodied to connect to the channel of the column of the disposable cartridge, e.g. whilst piercing through the top sealing film of the disposable cartridge, so that base liquid can be fed into the channel. FIG. 11 shows the lance 30 connected to the channel 14 of the column 12 of the disposable cartridge 3.

During dispensing, base liquid is fed through the lance 30 into the channel 14 and emerges as a stream 53 from the dispensing aperture 15 at the bottom of the cartridge body 9, where the exterior of the stream merges with the liquid ingredient 54 dispensed from the one or more dispensing passage outlet openings 24, see FIG. 12.

Besides the base liquid feed assembly, the beverage dispensing apparatus 2 is provided with a holder 27 and an operable displacement device 29.

The holder 27 is configured for accommodating and retaining the disposable cartridge 3 at the dispensing location in the device 2.

In the embodiment shown, the holder 27 is embodied as a sliding drawer, equipped to accommodate and retain the cartridge 3 in a substantially horizontal position with the bottom 9 of the cartridge downwards and the channel 14 in the column 12 of the cartridge vertical. The holder 27 has an aperture below the bottom of the cartridge, see FIG. 1, in such a way that during dispensing of the liquid product the product remains clear of the holder. This avoids undue disturbance of the flow, e.g. avoiding reduction of the carbon dioxide content of the liquid product and/or soiling of the apparatus and/or cross contamination between successive servings.

The operable displacement device 29 is adapted to produce a movement of the holder 27 for the cartridge 3 and the base liquid feed lance 30 relative to each other, so that when the displacement device is operated the lance connects to the column 12, moves the column down relative to the top 10 of the cartridge body 5, and thereby causes the bottom sealing film 7 to rupture and/or tear away from dispensing aperture 15, thereby allowing dispensing of the liquid ingredient 4 from the dispensing passage outlet openings 24, see FIGS. 11 and 12.

In the embodiment shown, the dispensing apparatus has an operable displacement device 29 comprising an excenter mechanism 36 and an electric motor adapted to produce a movement of the lance 120 relative to the cartridge 1 that is held in the holder 110.

FIG. 18 schematically shows the beverage dispensing apparatus, comprising the part shown in FIGS. 1, 10 and 11, and cartridge of FIG. 1. The apparatus 2 has a housing 205 and the drawer 27 for accommodating and retaining the cartridge 3 at a dispensing location in the apparatus. The dispensing location is directly above the support 215 for a drinking glass 216.

The apparatus 2 comprises the air pump 34 and the pressurization dome member 35 having along its periphery the outer gas seal adapted to sealingly engage the disposable cartridge 3 around a location where the top sealing film is pierced to allow entry of pressurized air from the air pump into the reservoir.

The base liquid feed lance 30 is integrated with the dome member 35 as a reciprocating unit, here vertically, driven by operable displacement device 29, here with the excenter mechanism and an electric motor, which is adapted to produce a movement of the dome member 35 and lance 30 relative to the cartridge 3 that is held in the holder 27.

The apparatus 2 has a water inlet 39 to be connected to a water main. Reference numeral 265 denotes a water chiller device to chill the water, e.g. to a temperature between 2 and 10 Celsius.

The outlet of the water chiller device 39 is connected, via valve assembly 266, on the one hand directly to the lance 30 and on the other hand to a carbonator 51, e.g. an inline or tankless carbonator. A CO2 bottle 275 is also connected to the carbonator 51 so that the CO2 can be dissolved in the chilled water and then fed to the lance 30.

Reference numeral 280 denotes a flow through water heater adapted to provide hot water to the lance 30. The flow thereof is controlled by hot water valve 281.

Reference numeral 300 denotes a temperature sensor that is adapted to sense the temperature of the cartridge 3, e.g. when located at the dispensing location in the apparatus.

The sensor 330 is connected to a gas pressure control device 310 which controls the operation of the air pump 34, e.g. so as to allow for a temperature dependent control of the air pressure to which the liquid ingredient in the reservoir of the cartridge is subjected.

In embodiments the air pump 34 is adapted to create an air pressure of between 0.5 and 2.5 bars above the atmospheric pressure. In embodiments the air pump 34 will create a predetermined air pressure dependent on a readable indication on the cartridge, e.g. by reading a barcode, preferably said pressure being constant over a dispensing cycle.

In embodiments a dispensing cycle for a glass of beverage, e.g. of about 250 ml, will take between 15 and 30 seconds.

In embodiment the volume ratio between the liquid ingredient and the base liquid may be between 1:4 and 1:10. For example a 50 ml volume of liquid ingredient in the reservoir is combined with 200-250 ml of carbonated water to fill a drinking glass.

In an embodiment the dispensing flow rate of the liquid ingredient from the reservoir is substantially uniform over the dispensing cycle of the base liquid, e.g. about 2-3 ml per second.

At a distance below the dispensing location of the holder the apparatus 2 has a standing place 215 for a mug or other receptacle, e.g. a drinking glass 216 for receiving the combined streams of base liquid and liquid ingredient.

FIG. 10 shows a cross sectional side view of the system of FIG. 1, prior to the start of a dispensing cycle, with the column 12 of the cartridge in its initial position and top sealing film 6 and bottom sealing film 7 intact.

FIG. 11 shows a cross sectional side view of the system of FIG. 1, during a dispensing cycle, with the the feed lance 30 connected to the column 12, with the column 12 of the cartridge in its lower dispensing position, with top sealing film 6 pierced and with bottom sealing film 7 film torn away from the dispensing aperture 15 and the dispensing passage outlet openings 24, thereby allowing the liquid ingredient to be dispensed via the dispensing passages.

In this design the carbonated water simply passes through the channel 14 of the column 12, and emerges from the dispensing aperture of the column 12 as a stream of carbonated water. In the embodiment shown, the channel 12 forms a rectilinear extension of a duct 31 in the feed lance 30 of similar cross-section. While passing the channel 14 the flow of the carbonated water is not hindered or disturbed by for example protuberances projecting into the channel, curves or corners in the trajectory of the channel, or colliding flows of base liquid or liquid ingredient. Also, in the embodiment shown, the flow of base liquid is dispensed from the dispensing aperture straight down into a drinking vessel for the consumer without any contact with a portion of the cartridge or of the apparatus.

By avoiding disturbances of the carbonated water flow the effect is achieved that the carbon dioxide gas dissolved in the carbonated water is retained therein as much as possible. This is beneficial for the quality of the beverage and also allows for efficient use of carbon dioxide gas, e.g. of importance when the carbon dioxide gas is stored in a gas bottle that needs to be replaced by a consumer when empty.

In an embodiment, the system is adapted to open, e.g. pierce, break, rupture and/or tear away at least part of the top sealing film provided on the disposable cartridge.

In the embodiment of the cartridge shown, for example in FIG. 2, the top sealing film covers the opening at the top end of the column and seals the inlet of the channel in the column. In such an embodiment, the base liquid feed lance is preferably embodied to pierce through the top sealing film of the cartridge to connect to the channel of the column of the disposable cartridge such that base liquid can be fed into the channel. In an alternative embodiment, the top sealing film is provided with a premade hole that is aligned with the inlet of the channel.

The top sealing film 6 hermetically seals the aperture 11 that communicates with the reservoir 8 holding the single serve portion of liquid ingredient 4. In an embodiment, the system is configured to pierce and/or rupture the top sealing film to provide access to the reservoir holding the liquid ingredient. In the particular embodiment shown, the disposable cartridge 3 is provided with multiple top sealing film piercing members 32, having a cutting top 33, which piercing members are arranged in the reservoir 8 underneath the top sealing film 7 with their respective cutting tops 33 positioned near the top seal 7, see FIG. 8.

When the top sealing film 7 is moved downwards the piercing members 32 engage the top sealing film and locally rupture the top sealing film thereby providing one or more holes in the top sealing film. In an embodiment, the top end of the column rests against the top sealing film when the column is in the higher initial position. In the embodiment shown, the top end 13 of the column 12 is connected to the top sealing film 6, e.g. heat-sealed, so as to achieve a sealed connection separating the channel inlet 26 from the reservoir 8. The top sealing film 6 is moved downward due to the column 12 of the cartridge body 5 being moved downwards from its initial position to its lower dispensing position and by the feed lance pressing down on the top sealing film.

Figure 9:
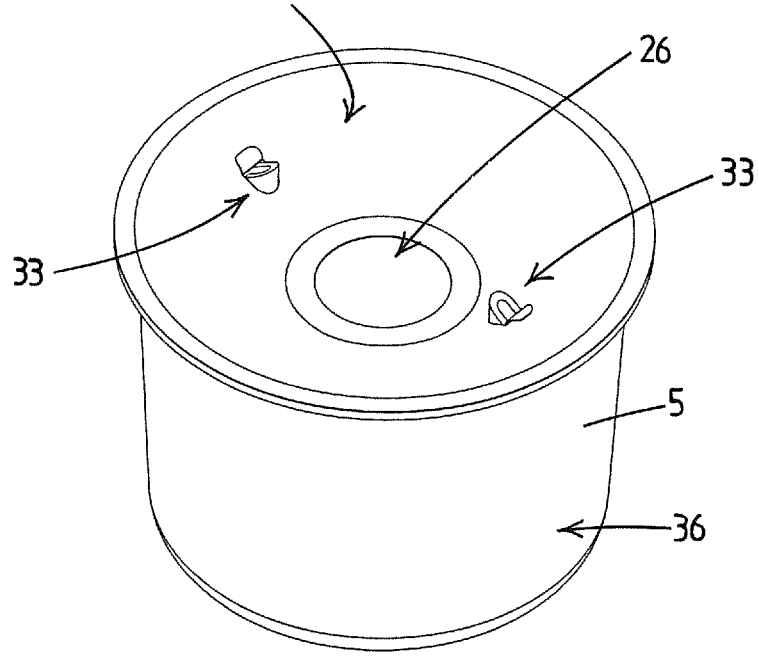
FIG. 9 shows a perspective top view of the cartridge of FIG. 1, with a column in a dispensing position.

The one or more holes provided by the piercing members 32 in the top seal 6 of the cartridge 3, see FIG. 9, allow for introduction of gas into the reservoir 8, and thus prevent a vacuum from occurring in the reservoir due to the outflow of the liquid ingredient 4. Such a vacuum may adversely affect the flow of the liquid ingredient. In the embodiment shown, the openings in the top seal are used to introduce pressurized gas, to assist and optionally actively control the flow of liquid ingredient.

In addition to, or as an alternative, in an embodiment the top sealing film is provided with one or more premade score lines, e.g. by laser machining the top sealing film, and said one or more premade score lines are adapted to rupture and thereby open the top sealing film due to the seal being stretched, for example by the feed lance moving the column downwards from its initial position to its lower dispensing position.

FIG. 9 shows the top sealing film 6 in a lowered position, due to the column 12 being moved into its lowered position. The cutting tops 33 of the piercing members 32 having pierced the top sealing film 6. In the preferred embodiment, the piercing members 35 are provided in the form of rib elements extending upwards from the bottom of the reservoir 8 and are at one side connected to the circumferential wall 36 of the cartridge 3. In the embodiment shown, the piercing members 32 are integral with the cartridge body 5. In an alternative embodiment, the piercing members are part of a separate component, which component is placed in the reservoir prior to sealing it.

In the embodiment shown, the piercing members 32 are provided with a U-shaped cutting top 33, when seen in top view. Due to the U-shape, the piercing members 32 enclose a channel, which channel is open along one side, that provides access to the reservoir 8 when the top sealing film 6 has been pierced. This configuration of the piercing members reduces the chance of parts of the pierced top sealing film blocking the openings pierced in the top sealing film.

In the embodiment shown, the piercing members 32 for piercing the top sealing film 6 sealing of the reservoir 8 are provided in the reservoir. In an alternative embodiment, in an addition to or as an alternative to the piercing members in the reservoir of the cartridge, the feed lance or other parts of the dispensing apparatus are provided with piercing members configured to open, e.g. pierce, break, rupture and/or tear away at least part of the top sealing film sealing the reservoir of the disposable cartridge. In an embodiment the apparatus comprises a puncture member adapted to puncture the top sealing film in an area between the central column and the circumferential wall, and the apparatus is adapted to feed pressurized gas, e.g., air, into said reservoir via said puncture member.

In an embodiment the dispensing apparatus comprises a base liquid supply in the form of a connection to a water mains or other water supply, a water chiller and a holding tank for chilled water, a carbonator device connected to a source of carbon dioxide gas, e.g. to a bottle of carbon dioxide gas, e.g. an inline carbonator adapted to dissolve carbon dioxide gas into a stream of chilled water that flows through a water duct from said chilled water holding tank to said base liquid feed lance as a single serving is prepared. In the embodiment shown, a first flexible hose 55 connects the base liquid supply 39 to the liquid feed lance 30. In an embodiment the apparatus comprises a cooling device adapted to cool said base liquid, e.g. to a temperature between 5 and 15° C. In an embodiment the apparatus is integrated in a domestic refrigerator, e.g. in a door thereof.

In an embodiment the apparatus comprises a carbonator. In an embodiment the liquid feed assembly is equipped to feed water as the base liquid, e.g. carbonated water, e.g. selectively carbonated and non-carbonated water, e.g. chilled, non-chilled, and/or hot non-carbonated water.

In the embodiment shown, the dispensing apparatus is provided with a water inlet 39 to be connected to a water mains. A carbonator 51 is provided in the channel connecting the water inlet 39 with the feed lance 30. Both components are schematically depicted in the FIGS.

In the embodiment shown, the dispensing apparatus 2 comprises a pressurized gas source, embodied as an air pump 34, schematically depicted in the FIGS., to pressurize the liquid ingredient 4 in the reservoir 8 of the disposable cartridge 3 to thereby assist the dispensing thereof from the reservoir via the one or more dispensing passages 22. This is for example advantageous if the liquid ingredient is rather viscous and also allows for control of said dispensing, e.g. in view of the ratio between the liquid ingredient and the base liquid, e.g. during a dispensing cycle of a single beverage. The gas pressure control may also be used to compensate, if needed, for any temperature dependent viscosity effect of the liquid ingredient, e.g. increasing gas pressure when the liquid ingredient is cold. In an embodiment the apparatus may comprise a temperature sensor adapted to sense the temperature of the liquid ingredient and/or of the cartridge at the start of the dispensing cycle, e.g. when placed in the holder of the apparatus or when arriving at or moving to the dispensing location. In an embodiment, the cartridge is provided with an identification representing the liquid ingredient therein, e.g. a barcode or otherwise, allowing a dispensing apparatus to read said identification in order to provide via the feed lance the appropriate base liquid. One can also envisage a user inputting said temperature, e.g. "cartridge taken from refrigerator" and "ambient temperature cartridge". One can also envisage the top sealing film have a temperature responsive coloring area, that changes color due to temperature change and thereby provides an indication of the actual temperature of the liquid ingredient. The apparatus may then have a sensor reading the temperature or an indicator thereof on the cartridge, or the user may be guided to provide the correct input for the apparatus.

In the embodiment shown, the dispensing apparatus is furthermore provided with a pressurization dome member 35 having annular gas seal 38 that is adapted to sealingly engage the top of the cartridge 3, e.g. the top sealing film 6 at an upper rim of a circumferential wall 36 of the disposable cartridge.

In the embodiment shown, the pressurized gas source 34 is connected to the pressurization dome member 35 via a second flexible hose 56. The pressurized gas source 34 is connected to the pressurization dome member 35 so as to allow feeding of pressurized gas beneath the dome member when the gas seal 38 thereof sealingly engages the top of the disposable cartridge 3 and the top sealing film 6 has been opened, to allow entry of pressurized gas into the reservoir 8 to pressurize said liquid ingredient 4 therein to thereby assist the dispensing thereof from the reservoir 8 via the one or more dispensing passages 22.

In the embodiment shown the base liquid feed lance 30 is integrated with the pressurization dome member 35 having said annular gas seal 38 so as to move in unison. In this design, the pressure dome member 35 is provided with a second annular gas seal 57 for engaging the top sealing film 6 at or near the top end of the column 12 of the disposable cartridge 3, to prevent leakage of pressurized gas into the channel of the cartridge. In the embodiment shown, this second annular gas seal 38 is provided on the feed lance such that it engages the top end 13 of the column 12. In an alternative embodiment, the second annular gas seal is provided on the feed lance such that it engages the inside of the channel of the column of the cartridge when the feed lance is coupled with said column.

In the embodiment shown, the dispensing apparatus 2 has an operable displacement device 29 comprising an excenter mechanism 37 and an electric motor adapted to produce a movement of the dome member 35 and feed lance 30 relative to the cartridge 3 that is held in the holder 27.

When the displacement device 29 is operated the feed lance 30 pierces the top sealing film 6 and connects to the channel 14 of the column 12. Continued downward motion of the feed lance 30, here along with the dome member 35, causes the base liquid feed lance to move the column 12 from its initial position into its lowered dispensing position, causes the piercing members 32 to pierce the top seal 6 and causes the bottom seal 7 to rupture and/or to tear away from the dispensing passage outlet openings 24, thereby opening the dispensing passage outlet openings. Furthermore, the downward motion of the dome member 35 causes the annular gas seal 38 to sealingly engage the top of the cartridge 3, e.g. the top sealing film 6 at the upper rim of the circumferential wall 36 of the disposable cartridge.

Thus, in this design the combined downward movement of feed lance 30 and dome member 35 enables dispensing of base liquid from the dispensing aperture and liquid ingredient from the dispensing passage outlets of the cartridge, the latter assisted by pressurization of the reservoir using a pressurized gas, and thereby allowing the dispensing of beverage concentrate or the like from the cartridge 1 to prepare the liquid product, e.g. a liquid food product, e.g. a beverage, e.g. a carbonated beverage.

The present invention also relates to a method for preparation of a liquid product, e.g. a liquid food product, e.g. a beverage, e.g. a carbonated beverage, wherein use is made of a cartridge 3 and an apparatus 2 according to the invention. The method comprises:

- sealingly engaging the annular gas seal 38 of the pressurization dome member 35 with the disposable cartridge 3 around a location where the top sealing film 6 is or will be opened to allow entry of pressurized gas into the reservoir, e.g. onto an upper end of a circumferential wall of the disposable cartridge,
- causing the top sealing film 6 to open,
- moving the column 12 of the cartridge 3 into its dispensing position, and thereby rupturing and/or to tearing away the bottom sealing film 7 from the dispensing passage outlet openings 24, thereby opening the dispensing passage outlet openings,
- feeding base liquid through the channel 14 of the column 12 of the cartridge 3, thus dispensing a stream of base liquid 53 form the dispensing aperture 15 at the bottom of the cartridge,
- feeding pressurized gas beneath said dome member 35 thereby pressurizing the liquid ingredient 4 in the reservoir 8 of the disposable cartridge 3 by said gas thereby assisting the dispensing thereof from the reservoir via the one or more dispensing passages 22,
- merge the liquid ingredient with the base liquid stream emerging from the dispensing aperture.

In the embodiment shown, the user starts by sliding open the drawer 27 and placing the cartridge 3 in a corresponding cavity in the drawer. The user closes the drawer 27 by sliding it with the cartridge 1 into the housing so that the cartridge is moved to the dispensing location of the apparatus. This situation is depicted in FIG. 10.

The displacement device 29 is now operated so that the basic liquid feed lance 30 pierces the top sealing film 6 and connects to the channel 14 of the column 12. Continued downward motion of the feed lance 30, here along with the pressurization dome member 35, causes the base liquid feed lance to move the column 12 to the dispensing position thereof, thus pressing the column downwards from its initial position to the lower dispensing position and thereby allowing the dispensing of beverage concentrate or the like from the cartridge 3. This situation is depicted in FIG. 11.

As is preferred, the disposable cartridge 3 is provided with one or more piercing members 32, here two, that are arranged underneath the top sealing film 6, so that pressing the top sealing film downwards, here by the base liquid feed lance 30, causes the piercing members 32 to engage the top sealing film 6 and to locally rupture the top sealing film, thereby providing holes in the sealing film that allow for introduction of pressurized gas into the reservoir 8 in order to pressurize the liquid ingredient 4 therein so as to assist dispensing thereof via the dispensing passages 22 when the column 12 is in the dispensing position. In this example the piercing members 32 are embodied as integrally molded spike formations, see FIGS. 8 and 9. The cartridge is shown in isolation, i.e. without the dispensing apparatus, with its column in the dispensing position, its top sealing film pierced and its bottom sealing film torn away in FIGS. 6, 7, 9 and 12.

Now the supply of carbonated water as well as of pressurized gas, e.g. air, is started, possibly with some timed delay of the one relative to the other. The liquid ingredient 4 is now assisted in its travel through the dispensing passages 22 and the flow of dispensed liquid ingredient 54 blends with the stream of water 53 emerging from the dispensing aperture 15 of the channel 14. This merging of liquid ingredient and base liquid is depicted in FIG. 12.

The one or more outlet openings 24 of the one or more dispensing passages 22 are arranged to dispense the flow liquid ingredient 54 basically as an annular shroud around the stream of base liquid 53. The stream base liquid 53 and the flow liquid ingredient 54 adjoin one another rather immediately after they emerge from the cartridge 3 and in the further duration of travel they intermix, possibly with a final mixing occurring as the mixture swirls into the glass or other beverage drinking container. It is noted that said mixing is in particular seen when carbonated water is used as base liquid and then this manner of combining the liquid ingredient with the carbonated water is greatly beneficial for keeping the carbon dioxide in the base liquid. In contrast, an effective jetting of one or more streams of liquid ingredient into the stream of carbonated water is observed to agitate the carbonated water in undue manner and thereby cause much of the carbon dioxide to escape so that the final beverage contains limited carbon dioxide.

Once the single serving is prepared the flow of water or other base liquid is stopped. If desired some gas flow may be continued to fully empty the cartridge and/or to assure that the final drops of liquid ingredient, e.g. beverage concentrate, are discharged. This avoids loss of ingredient and soiling of the apparatus.

At the end of the dispensing cycle, the dome member 35 and lance 30 have been moved to their initial position, clear from the cartridge 3, allowing the removal of the cartridge 1, here by opening the drawer 27 and taking out the cartridge.

In the preferred embodiment of a system according to the invention shown, the cartridge, when placed in the holder, is suspended from an upper flange as the holder forms a corresponding support surface for said upper flange.

In FIGS. 4 and 8, it is shown that the cartridge body 5 has a circumferential wall 36 having an upper rim bounding the opening that provides access to the reservoir. The top sealing film 6 is fixed to said upper rim, e.g. embodied as an outwardly projecting flange 44, e.g. the radially projecting flange is furthermore embodied to support the cartridge on a bearing surface of a dispensing apparatus, in the embodiment shown the drawer 27. As is preferred, in the embodiment shown, the outer gas seal 38 of the dome member 35 engages also on the top sealing 6 film on the upper rim 44.

Furthermore, the holder 27 for the cartridge 3 is equipped to accommodate and retain the cartridge in a substantially horizontal position with the bottom 9 of the cartridge downwards, the holder having an aperture below the bottom of the cartridge in such a way that during dispensing of the liquid product said product remains clear of the holder.

It is noted that the premade hole 25 in the bottom sealing film 8, aligned with the dispensing aperture 15, e.g. having a diameter the same or similar to said dispensing aperture, avoids the risk of said bottom sealing film, or portion thereof, interfering with the stream of base liquid emerging from the dispensing aperture when the column has been moved into its dispensing position. As explained, in view of retention of carbon dioxide and/or other gas in the carbonated water, it is desirable to not hinder the stream as any hindrance causes loss of gas from the stream.

Also, in this design, there is no need for the user to remove the bottom sealing film. The cartridge causes the effective opening of the bottom sealing film due to the column being moved to its lower dispensing position.

In the embodiment shown, the portion of the column 12 that projects upwards from the bottom of the cartridge body 9 to the top end 13 of the column 12 is an upper portion 40 of the column 12, and the column 12 further has a lower foot portion 41, which foot portion projects downwards from the bottom of the cartridge body to the bottom end of the column 16, such that the bottom surface 19 of the wall 17 of the column 12 and the dispensing aperture 15 at the bottom end of the column 12 are spaced from the bottom 9 of the cartridge body 5. This feature allows for an effective opening of the bottom sealing film 7 as the foot portion 41 of the column 12 protrudes into and through the premade hole 25 in the bottom sealing film as the column 12 is moved into its lower dispensing position. Also this design allows to avoid any desire of the liquid ingredient to adhere to the bottom of the cartridge and stick thereon and/or flow away from the dispensing aperture where the ingredient merges with the stream of base liquid.

In an alternative embodiment, the lower end of the column may be level with the bottom of the cartridge. In such an embodiment the one or more dispensing passages may be at least partially arranged in the bottom of the cartridge body with the one or more dispensing passage outlet openings arranged in the bottom of the cartridge body, adjacent to the dispensing aperture of the column, so that liquid ingredient emerging from said one or more dispensing passage outlet openings contacts the exterior of the stream of base liquid emerging from the dispensing aperture at the bottom end of the column.

In the embodiment shown the one or more dispensing passages 22 are arranged in the wall 17 of the column 12, and the dispensing passage outlet openings 24 are provided in the bottom surface 19 of the wall 17 of the column 12. This design effectively creates ducts within the thickness of the relevant portion of the column, e.g. within the above-mentioned foot portion 41 which is preferred.

In the embodiment shown, the dispensing passages 22 extend parallel to the rectilinear central channel 14 of the column 12. The liquid ingredient emerging from the one or more dispensing passage outlet openings 24 provided in the bottom surface 19 of the wall 17 of the column 12 has a direction generally parallel to the stream of base liquid 53, e.g. carbonated water, emerging from the dispensing aperture 12, e.g. so as to avoid any undue disturbance of the carbonated water stream.

In the embodiment shown, which is aimed to create a well-directed stream of base liquid 53 that merges and then mixes autonomously with the liquid ingredient 54, the bottom surface 19 of the wall 17 of the column 12 extends perpendicular to a central axis of the channel 14.

Furthermore, the one or more outlet openings 24 of the dispensing passages 24 are arranged to dispense the liquid ingredient as an annular shroud around the exterior of the stream of base liquid.

In the embodiment shown, the dispensing passages 22 comprises semi-circular cross-section outlet passages 24, seen in vertical direction, e.g. each associated with one inlet opening. Furthermore, the dispensing passage inlet openings 23 have a cross-section that is a fraction of the cross-section of the dispensing passage outlet openings 24.

Figure 13:
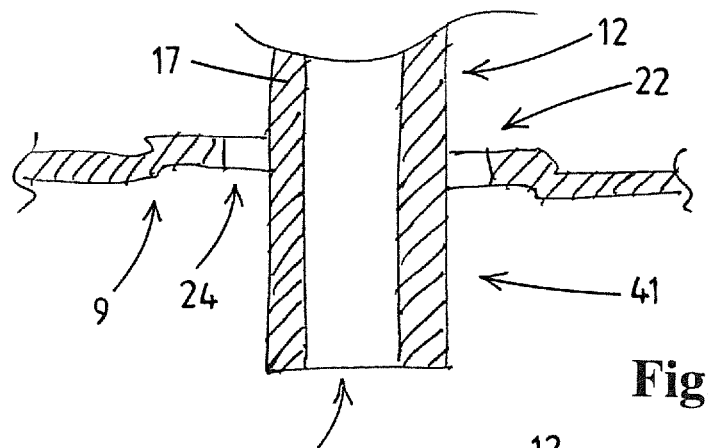
FIG. 13-15 schematically show partial cross sectional views of alternative dispensing channels in a cartridge according to the invention.

FIG. 13 shows part of an alternative embodiment of a cartridge according to the invention. In this design the column 12 is provided with a foot portion 41 and the one or more dispensing passages 22 are arranged in the bottom 9 of the cartridge body 5, adjacent to the foot portion of the column, preferably in a circular arrangement around the foot portion of the column, so that liquid ingredient emerging from the one or more dispensing passage outlet openings 24 contacts an outside surface of the wall 17 of the foot portion 41 of the column 12, and flows over the outside surface of the wall of the column to merge with a base liquid stream emerging from the dispensing aperture 15 at the bottom end 16 of the column. Therefore, instead of flowing through passages within the thickness of the wall, the liquid ingredient flows along an outside surface until it reaches the lower end thereof and then merges with the base liquid stream emerging from the dispensing aperture 15.

Figure 14:
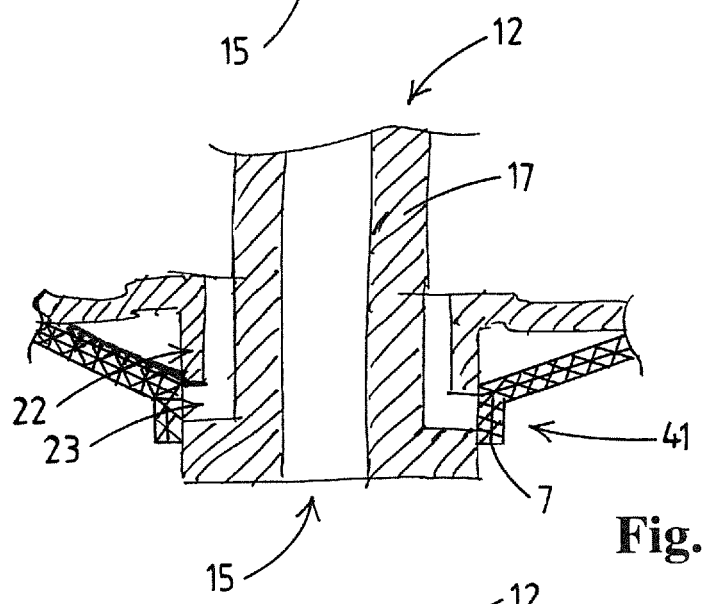

FIG. 14 shows part of an alternative embodiment of a cartridge according to the invention wherein the one or more dispensing passage outlet openings 23 are arranged in an outside surface of the wall 17 of a foot portion 41 of the column 12, between the bottom 9 of the cartridge body 5 and the bottom end 16 of the column 12. Also in this embodiment, the liquid ingredient emerging from said one or more dispensing passage outlet openings and flows over the outside surface of the wall of the column to merge with a base liquid stream emerging from the dispensing aperture 15 at the bottom end of the column 12. In FIG. 14 also part of the bottom sealing film 7 is shown. In this design, the bottom sealing film 7 is secured to the outside surface of the foot portion of the column, thus sealing the dispensing passage outlet openings when the column is in its initial position, as depicted in the figure.

Figure 15:
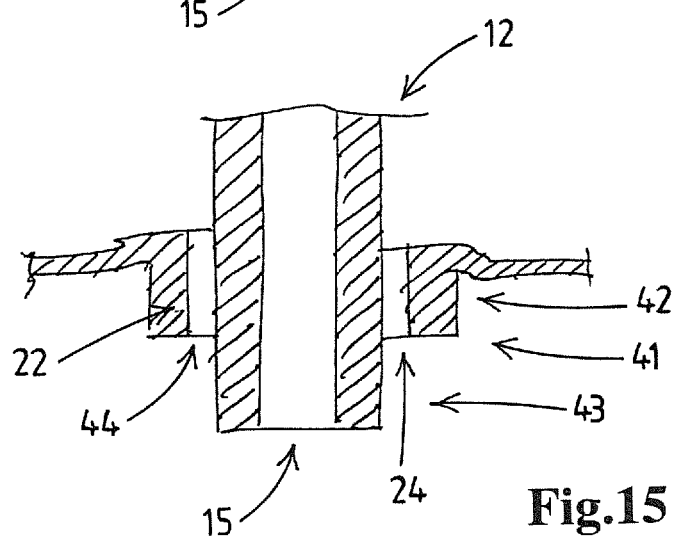

FIG. 15 shows yet another embodiment of a cartridge according to the invention, the foot portion 41 of the column 12 has a first portion 42 adjacent the bottom 9 of the cartridge body 5 with a first diameter and an adjoining second portion 43 with a second diameter smaller than said first diameter, which first and second foot portion are separated by a shoulder 44. Thus, the foot portion 41 of the column 12 is provided with a setback in the form of the second portion having a smaller diameter. In this design, the one or more dispensing passages 22 are arranged in the wall 17 of the column 12, and the dispensing passage outlet openings 24 are provided in the shoulder 44, so that liquid ingredient emerging from said one or more dispensing passage outlet openings flows over the outside surface of the wall of the second foot portion 43 to merge with a base liquid stream emerging from the dispensing aperture 15 at the bottom end of the column 12.

The embodiments shown in FIGS. 13-15 can be provided with a bottom sealing film and/or with an internal valve, located inside the reservoir of the cartridge. The bottom sealing film can for example be secured to the shoulder and/or the outside surface of the foot portion of the column, for example as shown in FIG. 14.

It is noted that in a preferred embodiment according to the invention, the dispensing passages extend between inlet openings located in the reservoir of the cartridge and outlet openings located at the outside of the cartridge. The dispensing passage outlet openings, from which the liquid ingredient emerges, are located level with, or higher than, the dispensing aperture from which the stream of base liquid emerges. Thus, the flow of liquid ingredient is dispensed at or above the dispensing aperture.

Furthermore, the flow of liquid ingredient is preferably guided parallel to the stream of base liquid, by the dispensing passage channels and/or by an outside surface of the wall of the column that delimits the channel, prior to being dispensed. The flow of liquid ingredient and the stream of base liquid are prior to being dispensed from the cartridge preferably separated only by the wall of the column that delimits the channel, such that the liquid ingredient is dispensed in a flow parallel to the flow of the base liquid emerging from the dispensing aperture. Furthermore, the flow of liquid ingredient is thus provided close enough to the stream of base liquid that it is "picked up" by the stream of base liquid.

Therefore, in a preferred embodiment of a cartridge according to the invention, the stream of base liquid and the flow(s) of liquid ingredient are dispensed as parallel flows, separated only by a wall portion of the cartridge. After being dispensed, the parallel flows merge, the liquid ingredient coating the exterior of the stream of base liquid. Actual mixing of the liquid ingredient with the base liquid only takes place after the base liquid and the liquid ingredient have been dispensed.

In a further preferred embodiment, the lower portion of the column is provided with a series of outlet openings of the one or more dispensing passages, which outlet openings are arranged in a circular arrangement around the outlet or aperture from which the base liquid, e.g. carbonated water emerges. In a preferred embodiment the one or more outlet openings are arranged to dispense the liquid ingredient basically as an annular shroud around the stream of base liquid. As set out above, the stream of base liquid and flow of liquid ingredient adjoin one another rather immediately after they are dispensed from the cartridge and in the further duration of travel they intermix, possibly with a final mixing occurring as the mixture swirls into the glass or other beverage drinking container. It is noted that said mixing is in particular seen when carbonated water is used as base liquid and then this manner of combining the liquid ingredient with the carbonated water is greatly beneficial for keeping the carbon dioxide in the base liquid. In contrast, an effective jetting of one or more streams of liquid ingredient into the stream of carbonated water is observed to agitate the carbonated water in undue manner and thereby cause much of the carbon dioxide to escape so that the final beverage contains limited carbon dioxide.

In an embodiment wherein the ingredient flows along the outside surface of the foot portion of the column, one or more discharge grooves are provided in the outside surface of the foot portion of the column for guiding the liquid ingredient that emerged from the one or more discharge outlet openings. In an embodiment, each discharge groove extends from one or more dispensing passage outlet openings towards the bottom end of the column, preferably up to the end face of the foot portion of the column. The one or more grooves may serve to distribute the flow of liquid ingredient, e.g. to form a shroud of the liquid ingredient around the stream of base liquid emerging from the dispensing aperture. In an embodiment, the grooves may be provided in a helical pattern on the outside surface of the foot portion. The one or more grooves may also be structured to slowdown the liquid ingredient as it emerges from the one or more outlet openings and/or to direct said flow to a flow that is substantially parallel, e.g. vertical, to the emerging stream of base liquid.

In a preferred embodiment, for example shown in FIGS. 4 and 5, the one or more dispensing passage outlet openings are arranged in a circular arrangement around the dispensing aperture and the bottom sealing film hermetically seals the at least one or more dispensing passage outlet openings, and the bottom sealing film is adapted to rupture and/or to tear away from the dispensing passage outlet openings due to the column being moved downwards to its lower dispensing position, thereby opening the dispensing passage outlet openings. This embodiment allows for the bottom sealing film to directly seal the one or more outlet openings, thereby obviating the need for any further valve or the like to close the dispensing passages.

In the embodiment shown, the bottom of the cartridge has an annular flexible portion 21 around the column 12 to allow movement of the column in the vertical direction. The cartridge body further has a non-flexing portion 50 surrounding the flexing portion 51, with the bottom sealing film being 7 secured to, e.g. by heat-seal, to the non-flexing portion. In combination with a suitable vertical stroke of the column, the bottom sealing film will rupture and and/or tear away from the outlets of the dispensing passages.

In an embodiment the bottom sealing film has an inner loop shaped sealing area, which is sealed to the bottom end of the column around the dispensing aperture, and an outer loop shaped sealing area, which is sealed to the cartridge body remote from the one or more dispensing passage outlet openings, e.g. to a non-flexible part of the bottom of the cartridge. It is then envisaged that the inner loop shaped area will release upon motion of the column to its lower dispensing position, whereas the outer loop shaped area remains fixed to the cartridge. Preferably a foot portion of the column is effectively pushed into and through the premade hole in the bottom sealing film, preferably without the bottom sealing film being torn.

It is observed that the bottom sealing film, when hermetically sealing the dispensing passage outlet openings, can be sealed to the column around the dispensing passage outlet openings, thus sealing said openings. In such an embodiment, the outer circumference of the sealing film, attached to the cartridge body away from the dispensing passage outlet openings, does not need to perform a sealing function, and just needs to be attached to the cartridge to enable the seal to be torn away from the dispensing aperture and dispensing passage outlet openings when the column is moved into its dispensing position. Thus, the bottom sealing film can be sealed to the cartridge body at discrete points, and does not require an uninterrupted sealing along its outer circumference.

As is illustrated it is envisaged that the flexible bottom portion 21, in the downward dispensing portion of the column 12, forms a downward funnel so that residual liquid can reach the dispensing inlet openings 23 that are, optimally, arranged in the column 12 near the bottom of the cartridge, and thus at the bottom of the funnel created by lowering the column. If, as desired, the flexible bottom portion 21 flexes back to, or substantially into, its initial position the same arrangement avoids or further hinders any residual leakage of liquid ingredient from the cartridge after a beverage or the like has been prepared and the feed lance 30 has been moved upwards.

Figure 3:
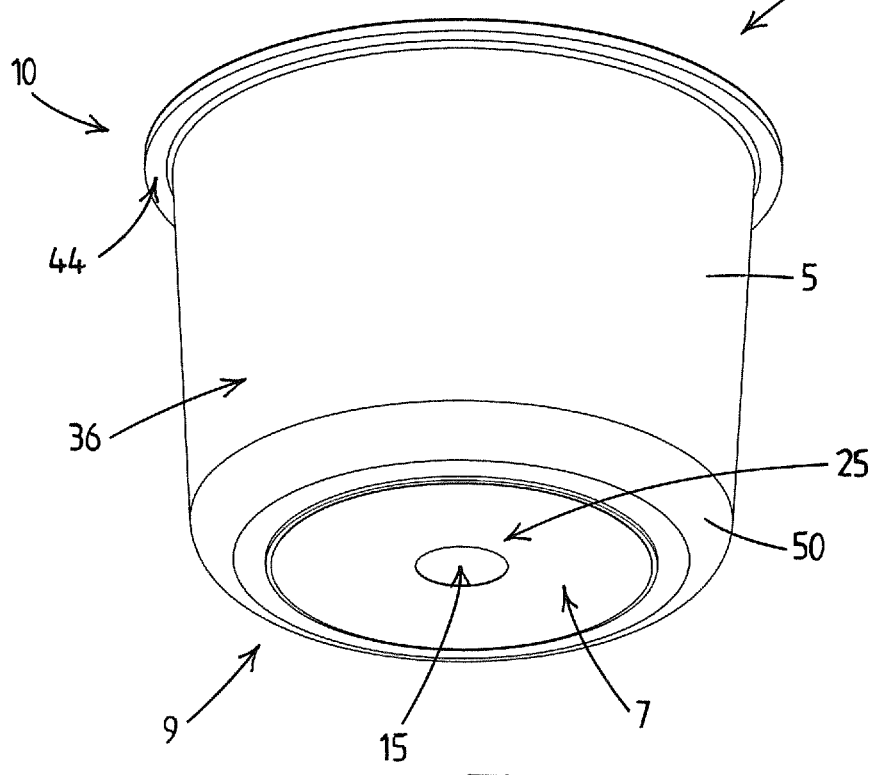
FIG. 3 shows a perspective bottom view of the cartridge of FIG. 1.

In the embodiment shown in FIGS. 2 and 3, the cartridge body 5 has a circumferential wall 36 around the perimeter of the bottom 9 of the cartridge, and the channel 12 is concentric relative to an axis of the circumferential wall of the cartridge. In other embodiments the column is offset from the center of the cartridge, e.g. adjacent one side of the circumferential wall. It is noted that in such an embodiment, the column may still be provided with an annular, even a circular, flexing portion around the foot of the column to enable movement of the column.

In an embodiment the combined area or cross-section of the one or more dispensing passage outlet openings is multiple times larger than the combined area of the one or more dispensing passage inlet openings, e.g. at least 10 times larger. For example, the cartridge 3 shown in FIG. 8 is provided with two dispensing passage inlet openings 23, see FIG. 8, and two corresponding dispensing passage outlet openings 24, see FIG. 7, which outlet openings 24 each have a cross section multiple times larger than the cross section of the corresponding inlet openings 23.

An embodiment in which the combined area or cross-section of the one or more dispensing passage outlet openings is multiple times larger than the combined area of the one or more dispensing passage inlet openings is of particular advantage when the dispensing apparatus that is used in conjunction with the cartridge is adapted to exert an expulsion force on the liquid ingredient in the reservoir, e.g. a gas pressure on the liquid ingredient in the reservoir. The relatively narrow inlet openings than act as a throttle for the liquid ingredient which allows to create a stable flow rate into the one or more dispensing passages on the basis of the expulsion force. The larger size of the outlet openings of the same dispensing passage(s) then allows for a slowdown or retarding of the liquid ingredient before it finally emerges from the outlet opening.

In an embodiment the one or more dispensing passages are provided with a flow restriction, preferably a fixed or constant flow restriction formed as a portion of the dispensing passage, e.g. in the form of one or more narrow inlet openings, for example the combined inlet openings or other flow restriction portions having a cross section of at most 8 mm2. For example, the one or more inlet openings having a cross section of between 1 and 2 mm2 each. It will be appreciated that depending on the viscosity of the liquid ingredient to be dispensed from the reservoir the flow restriction can be tailored upon manufacturing of the cartridge.

In the embodiment shown, see FIGS. 4 and 5, the dispensing passage inlet openings 23 are oriented at an angle relative to an adjoining section of the dispensing passage 22 such that a jet of liquid ingredient passing through the inlet opening, e.g. embodied as a flow restriction of the passages, collides against a wall portion of the passage thereby reducing, preferably annihilating, the speed of said jet.

In an embodiment the one or more dispensing passages are provided with a narrow inflow section and a wide outflow section, such that the narrow inflow section forms a restriction for a flow of liquid ingredient that flows from the reservoir to the dispensing passage outlet openings. In such an embodiment, the flow restriction is formed as a portion of the dispensing passage and is thus located inside the dispensing passage, i.e. downstream of the dispensing passage inlet opening. The wide outflow section, following the narrow inflow section, then allows for a slowdown of the liquid ingredient before it emerges from the dispensing passage outlet opening(s).

In an embodiment the outflow section extends substantially parallel to the channel in the column and the inflow section extends at an angle to the outflow section, such that a jet of liquid ingredient passing through the inflow section, e.g. due to gas pressurization of the liquid ingredient, collides against a wall portion of the outflow section of the dispensing passage, thereby reducing, preferably annihilating, the speed of said jet.

In the embodiment shown in for example FIG. 2, the channel 14 in the column 12 has an upper channel portion 45, extending from the inlet of the channel 14, with a first diameter and an adjoining lower channel portion 46, extending to the dispensing aperture 15 of the channel, said lower channel portion and dispensing aperture having a second diameter, wherein the first diameter is greater than said second diameter. This stepped diameter of the channel 14 allows to introduce a front end of the feed lance 30 into the wider upper portion 45 with the duct within the feed lance having an inner diameter that substantially corresponds to the second diameter. In this manner the inner duct of the feed lance 30 and the lower channel portion form an approximately constant diameter duct for the base liquid, e.g. carbonated water, flowing through the feed lance and the adjoining portion of the channel in the cartridge. This avoids or at least reduces undue disturbance of the flow of base liquid, which in the event of carbonated water would result in an extra loss of carbon dioxide gas from the water.

In an embodiment the dispensing aperture of the channel of the column, preferably also the adjoining second portion of the channel, has a diameter between 6 and 15 millimeter, e.g. about 10 millimeter.

In an embodiment the cartridge body comprises an injection molded monolithic plastic body part, the monolithic plastic body part at least comprising a circumferential wall, a bottom, and a portion of the column, e.g. a foot portion of the column and possibly also a lower part of the upper portion of the column, e.g. the part defining the above-mentioned second diameter, wherein, in an embodiment, the remainder of the column is embodied as a separately molded plastic part that is fitted onto the lower part of the upper portion of the column. The latter embodiment may e.g. be advantageous in view of injection molding technology, as it allows for simplification of the mold for the monolithic plastic body part.

Figure 16:
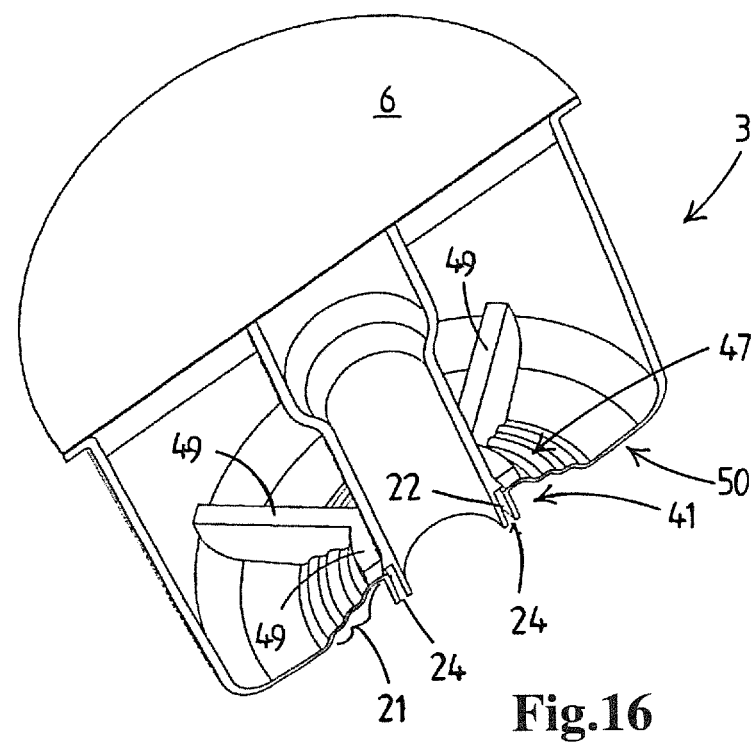
FIG. 16 shows a cross sectional view of an alternative embodiment of a cartridge, the cartridge being provided with an internal valve.
Figure 17:
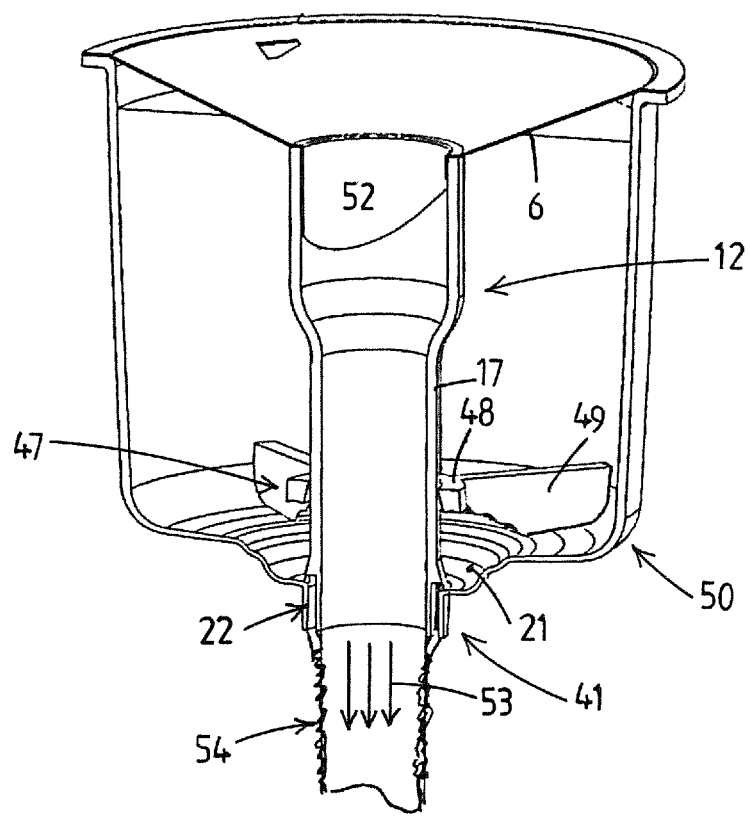
FIG. 17 shows a cross sectional view of the cartridge of FIG. 16, with the column of the cartridge in a dispensing position.

With reference to FIGS. 16-17 now another example of a disposable cartridge 3 will be discussed, which cartridge is provided with a valve member 47 arranged within the reservoir 8 of the cartridge and outside of the column 12, which valve member is stationary arranged within the cartridge so as to be movable, e.g. slideable, relative to the column when the column is moved from its higher initial position to its lower dispensing position. When the column is in the higher initial position, see FIG. 16, the valve member closes the one or more dispensing passages, such that the reservoir is closed, and when the column is in the lower dispensing position, see FIG. 17, the valve member has moved away from the one or more dispensing passages, such that the reservoir is opened. This embodiment affords a closing of the reservoir right at the dispensing passage inlet openings.

The valve member 47 can be manufactured as a separate component that is assembled into the cartridge 3. It is however more preferred to embody the valve member 47 by means of co-injection molding of the valve member after the body 5 has been molded. As will be appreciated the valve member 47 should not become unitary with the body of the cartridge in such a manner that it would be solidly fused to the column and the flexible portion of the body so as to obstruct the illustrated way of operation of the valve member and cartridge.

It is proposed to co-inject the valve member 47 such that only a light adherence, or even no adherence at all, is created between the plastic of the valve member and the plastic of the body 5 of the cartridge 3 including the column 12. This can be realized by selecting non-compatible plastics, e.g. the body can be made of amorphous plastic, for example of PP. The valve member can be molded from crystalline plastic, e.g. polycarbonate PC or ABS. These combinations allow to obtain a light adherence of the valve member 47 to the surfaces of the body 5 that are in contact with the valve member.

It is illustrated that the valve member has an annular portion 48 surrounding the column 12, which annular portion 48 has a sealing face that extends over the dispensing passage inlet openings 24 and is in sealing contact with a corresponding annular sealing face around the column.

In order to maintain the stationary position of the valve member 47 when the column 12 is pressed down, the valve member 47 here has one or more spoke portions 49 that extend away from the annular portion 48 to be supported on a non-flexing portion 50 of the bottom and here, as is preferred also extending to support against the circumferential wall 36 of the body of the disposable cartridge 3. It is illustrated that the non-flexing bottom portion 50 extends around the flexible portion 21 of the bottom.

As can be seen in FIG. 17, the valve member 47 does not follow a downward motion of the column 12, with the result that the valve member no longer covers or closes the one or more dispensing passage inlet openings 23 of the one or more dispensing passages 22. Even when, as here, the valve member 47 was molded to extend over the flexible bottom portion 21, the non-adherence or light adherence allows the flexing portion to deform and move away from the valve member.

FIG. 17 also illustrates the piercing or otherwise rupturing of the top sealing film 6 in order to allow entry of pressurized gas into the reservoir 8 for the purpose of pressurization of the liquid ingredient 4 within the reservoir. This may be done by one or more piercing members, not shown in FIGS. 16-17, or the like formed integrally with the body of the cartridge underneath the film as discussed earlier. Furthermore, the piercing by the lance 30 of the portion of the top sealing film 6 covering the inlet of the channel 14 is shown at 52.

FIG. 17 very schematically illustrates how the, rather slow moving, streams of liquid ingredient 54 adjoins the outside of the central stream of base liquid 53, here carbonated water, and in the further course of travel into the drinking vessel gradually intermixes with the base liquid. In case of carbonated water it is preferred that the emerging streams of liquid ingredient does not intersect the water flow but rather flows along and then adjoins, preferably as an annular shroud, the water flow.

It is illustrated in FIG. 16, see also FIG. 12, that preferably the dispensing passage inlet openings 23 are oriented at an angle relative to the dispensing passage such that a jet of liquid ingredient emerging from an opened inlet, e.g. due to pressurization of the liquid ingredient as discussed herein, collides against a wall portion of the dispensing passage thereby reducing, preferably annihilating, the speed of said jet.

In a most desired manner, even with a jetting of liquid ingredient from the dispensing inlet openings 23, the liquid ingredient effectively streams down mainly under the influence of gravity with the stickiness of the liquid ingredient in combination with an appropriate narrow shape of the passage maintain a slow speed of the emerging liquid ingredient.

Effectively it is desirable for the dispensing passage 22 to act as a flow resistor for the liquid ingredient, so that pressurization of the liquid ingredient as discussed herein using pressurized gas, can be used to cause an even stream of liquid ingredient from the one or more dispensing passage outlet openings 24.

It will be appreciated that the design discussed with reference to for example FIGS. 16 and 17 does not require the presence of a valve member as the bottom sealing film keeps the dispensing passage outlet openings closed until the column is moved downwards. In an embodiment a valve member may still be provided, in which case the bottom sealing film mainly will serve to counter an ingress of matter into the dispensing passages. The latter can of course also be countered by packaging the cartridge in an outer envelope, e.g. a sealed sachet containing one or more cartridges which can also be done for any other cartridge discussed herein. However, preferably, the valve member arranged within the cartridge is combined with a bottom sealing film adapted to rupture and/or to tear away from the dispensing passage outlet openings due to the column being moved downwards to its lower dispensing position, thereby opening the dispensing passage outlet openings.

The cartridges described above or at least their plastic bodies may alternatively be described as defining an annulus of U-shaped cross-section, with the filling aperture at the open end of the U being closed by the top sealing film.

Thus, the cartridge, for the production of a flavoured carbonated beverage from a stream of carbonated water, comprises a body shaped as an annulus of U-shaped cross-section defining a reservoir for receiving a liquid concentrate, being located between an outer circumferential wall and an inner circumferential wall or central column, the central column defining a flow channel for passage of the stream of carbonated water without entry into the reservoir, the reservoir having a ring shaped aperture at an open end of the U being closed by a top sealing film, wherein a bottom of the body at a closed end of the U has a flexible portion such that the central column can be displaced downwards with respect to the outer circumferential wall and wherein in use, downward displacement of the central column causes opening of a dispensing passage whereby concentrate can exit the reservoir and contact the stream after or during passage through the flow channel.

The cartridges described above and hereinafter or at least their bodies may alternatively be described as defining an annulus of U-shaped cross-section, with the filling aperture at the open end of the U being closed by the top sealing film. The cartridge bodies may most conveniently be formed of plastic materials e.g. in a one piece or multi-piece injection moulding operation or assembled from injection molded pieces, e.g. by laser welding a top portion piece of the column onto an integrally monolithic moulded cartridge body piece with circumferential wall, flexible bottom, and a further portion of the column. It is however not excluded that parts of the cartridge may be made by thermoforming or by blow moulding from a parison.

In this description, according to a preferred application of the invention, the liquid ingredient is a beverage concentrate that is to be combined with a flow of carbonated water to fill a single serve container, e.g. a drinking glass, with a single serving of a carbonated beverage. The disposable cartridge is filled with a single serve portion of said liquid ingredient, preferably to a level so that a head space 52 is present above the liquid ingredient.

In an embodiment of a dispensing apparatus according to the invention, the apparatus may be provided with a control device for the pressurized gas source, e.g. adapted to provide adjustable timing of the pressurization of the liquid ingredient, e.g. relative to the process of opening the dispensing passages, e.g. with a timed delay relative to the effective opening. The control device, e.g. a computerized control device for the pressurized gas source may also be linked to a cartridge identification assembly that is adapted to identify the cartridge, e.g. with respect to the liquid ingredient therein.

In an embodiment, the dome and/or feed lance and/or holder of the dispensing apparatus are provided with a locking device configured for engaging the cartridge and/or for cooperating with a locking device located on the cartridge to secure feed lance and/or pressurization dome member relative to the cartridge and/or secure the cartridge relative to the holder during the dispensing cycle. For example a bayonet coupling, screw thread, ratchets, etc. or any other suitable temporarily securing device can be used.

In the embodiment shown in FIGS. 10-11, the feed lance and the pressurization dome member are moved in unison. In an alternative embodiment, the operable displacement device is adapted to move the pressurization dome and feed lance independent of each other, for example to first engage the cartridge with the pressurization dome, and subsequently pierce the top seal, or at least the center part thereof, moving the feed lance downwards relative to the pressurization dome.

In an embodiment the diameter of the channel in the column of the cartridge is between 5 and 20 mm, e.g. between 8 and 16 mm, e.g. about 10 mm.

The bottom of the cartridge may e.g. have a diameter between 25 and 75 mm, e.g. between 40 and 60 mm. The circumferential wall adjoining the perimeter of the bottom may e.g. have a height between 25 and 75 mm, e.g. between 40 and 60 mm.

In an embodiment the inlet openings, or other flow restriction portions, have a combined cross section of at most 8 mm2, for example the one or more inlet openings each have a cross section between 0.3 and 1 mm, e.g. between 0.6 and 1.6 mm, e.g. about 1.4 mm.

In an embodiment the dispensing passage outlet openings are provided in the bottom wall surface of the column, and the width between opposing vertical wall portions defining the dispensing passage outlet openings is between 0.5 and 1.5 mm, e.g. between 0.7 and 1.2 mm, e.g. about 0.8 mm.

In an embodiment, dispensing aperture and the dispensing passage outlet openings are 0.4 to 1.0 mm apart from each other so that the shroud flow of liquid ingredient will easily adjoin the flow of base liquid, in particular when carbonated water is employed.

In the present context, reference to a dome member is not intended to imply any particular shape but merely the fact that the dome member is capable of sustaining a gas pressure in a space beneath the dome member. The dome member and its respective seal or seals may be capable of sealing the region beneath the dome member to a pressure of e.g. 4 bar.

It will be appreciated that the gas source should be able to supply pressurized gas, e.g. air by an air pump, at a flow rate that compensates for the discharge of liquid ingredient from the reservoir of the cartridge, e.g. at a rate of between 2-3 ml per second.

In embodiment the pressurized gas, e.g. air, is at a pressure of between 0.5-2.5 bar above atmospheric pressure.

It will be appreciated that the practical flow rate and pressure range can be achieved with a fairly simple air pump.

For example the reservoir holds between 20 and 75 ml of liquid ingredient, e.g. 50 ml.

For example a dispensing or serving cycle wherein a drinking glass or the like is filled with beverage, e.g. of a volume of 200-300 ml, lasts between 15 and 30 seconds.

In an embodiment, after or at the end of completion of the discharge of liquid ingredient from the reservoir, the gas may be used to purge the one or more dispensing passages, e.g. with a final boost of air, so as to avoid that residue remains in said passages.

In this context, flow of the base liquid, e.g. carbonated water, through the channel without impediment or construction may be defined as requiring the channel to have a cross-sectional area from inlet to outlet e.g. from top to bottom of the cartridge that is at no point smaller than 30 mm2, preferably always greater than 40 mm2 and even greater than 50 mm2. In general, the channel will not be greater than 200 mm2 in cross section.

In an embodiment the outlet or dispensing aperture of the channel has a diameter between 6 and 15 millimeter, e.g. about 8 or 10 millimeter. For non-round channels or apertures, the aperture may have a cross-sectional area greater than 30 mm2, preferably greater than 40 mm2 or even greater than 50 mm2. The aperture may also be less than 200 mm2 in cross section.

In an alternative embodiment the operable displacement assembly comprises a pneumatic motor, e.g. a pneumatic piston, to which pressurized gas, e.g. air, is supplied by an air pump. For example the apparatus has a single air pump that is connected to the dome member to pressurize the liquid ingredient, e.g. as discussed herein, and also connected to said pneumatic motor, e.g. with the provision of a valve assembly to direct the pressurized air to the motor or to the dome member. The provision of a single air pump in conjunction with a pneumatic motor for the operable displacement assembly allows to do away with an additional motor just for the operable displacement assembly. For example the dome member with the integrated liquid feed member is embodied as a pneumatic piston that is slidable in a corresponding cylinder.

Although reference here is made to an annular shroud and annular dispensing passage outlet, it will be understood that the base liquid stream need not be circular in cross section and could be oval, elongate, multi-lobal or any other shape that achieved the desired joining or merging with the liquid ingredient while avoiding undue release of carbon dioxide.

In an embodiment the one or more dispensing passages are embodied as flow resistor for the liquid ingredient passing there through. This arrangement allows to create a stable flow rate of liquid ingredient through the one or more dispensing passages, e.g. in view of the desire to dispense the total volume of liquid ingredient substantially in an even manner over the entire dispensing cycle, e.g. so that at no point in time plain base liquid is deposited in a drinking vessel which would be detrimental to user appreciation and beverage quality.

The invention furthermore provides: a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the cartridge body further comprises a column, with a channel which extends through the column from an inlet at said top end of the column to a dispensing aperture at a bottom end of the column, wherein a base liquid feed member is connectable to the inlet of the channel in the column, allowing to feed the base liquid into the channel and to dispense a stream of base liquid via the dispensing aperture, wherein the cartridge body is provided with one or more dispensing passages adapted to dispense the liquid ingredient from the reservoir, which one or more dispensing passages have one or more dispensing passage inlet openings arranged so that liquid ingredient in the reservoir can enter the one or more dispensing passages, and which one or more dispensing passages have one or more dispensing passage outlet openings arranged so that liquid ingredient emerging therefrom merges with said exterior of said base liquid stream that is dispensed from the dispensing aperture at the bottom end of the column, wherein the column has a lower foot portion, which foot portion projects downwards from the bottom of the cartridge body to said bottom end of the column, such that the bottom surface the column and the dispensing aperture at the bottom end of the column are spaced from the bottom of the cartridge body, wherein the cartridge has a bottom sealing film provided with a hole, which bottom sealing film is the bottom of the cartridge body such that the hole of the sealing film is aligned with the dispensing aperture of the column, wherein the bottom sealing film around the hole is sealed to the bottom end of the foot portion and at is sealed at its periphery at one or more locations to the bottom of the cartridge remote from the column, e.g. such that the bottom sealing film is provided with a conical shape, and which bottom sealing film is adapted to rupture and/or to tear away from the dispensing aperture, thereby allowing dispensing from the passage outlet openings, due to the cartridge being moved downwards into a lower dispensing position relative to a holder for accommodating and retaining the disposable cartridge at a dispensing location in a dispensing apparatus, which holder is provided with a stripping member, e.g. a stripping ring, for engaging the conically shaped bottom sealing film between its hole and its periphery.

Figure 19:
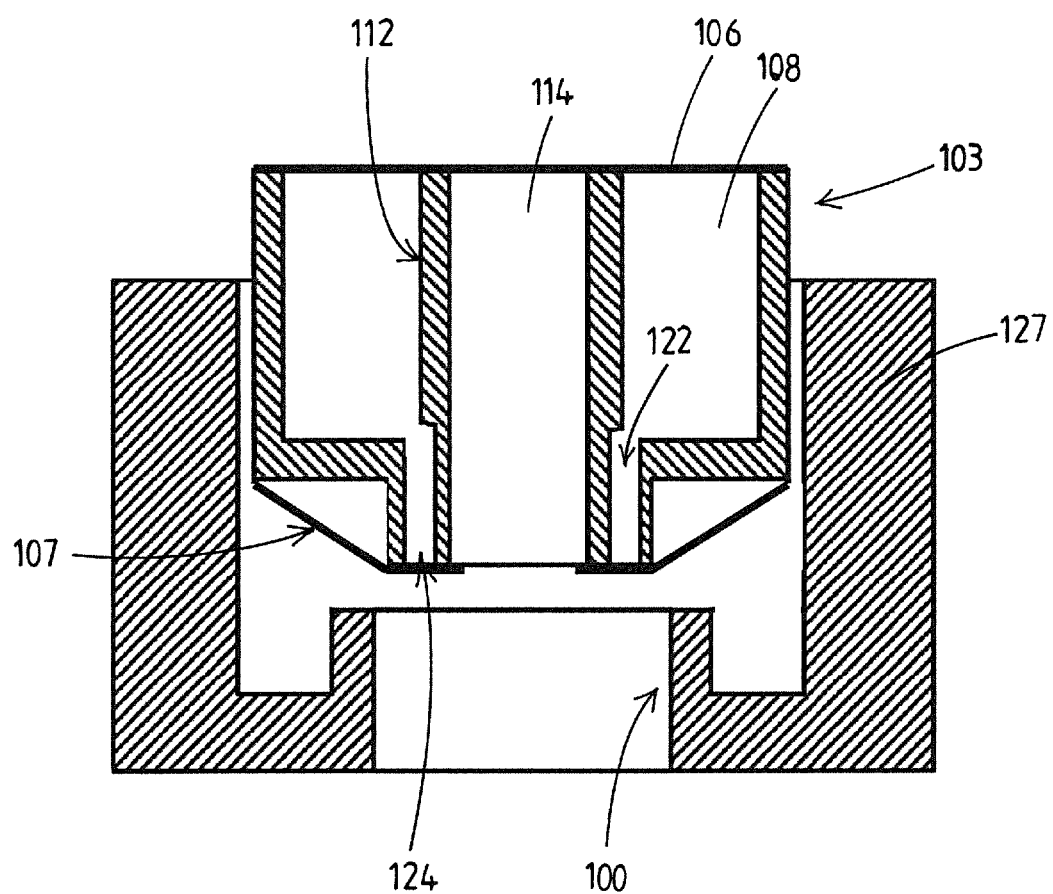
FIG. 19 schematically shows an alternative cartridge and a stripping member for removing a bottom seal of that cartridge away from a dispensing aperture.

Such a cartridge 103 is shown in FIG. 19. The cartridge 103 is depicted while it is lowered into the holder 127, just prior to the stripping member 100 engaging the bottom sealing film 107. In the embodiment shown, the cartridge 103 further comprises a reservoir 108, sealed with a top sealing film 106, a column 112 with a central channel 114, and dispensing passages 122 with their dispensing passage outlet openings 124 still sealed by the bottom sealing film 107.

In this design, the seal is ruptured and/or torn away from the dispensing aperture, by interaction between the bottom dispensing film and the holder in which the cartridge is placed. By pushing the cartridge in a downward direction into the holder, a stripping member provided in the holder engages the bottom sealing between its hole and its periphery and pushes the bottom sealing film towards the bottom of the cartridge. Thus the hole of the bottom sealing film is pulled over the foot portion of the column of the cartridge, and the foot portion of the column is effectively pushed into and through the premade hole in the bottom sealing film, preferably without the bottom sealing film being torn. In this design, the cartridge does not need a movable column.

In an embodiment, the bottom sealing film is an O-shaped bottom sealing film. In such an embodiment, the bottom sealing film has a conical shape when mounted on the cartridge. It is furthermore envisaged that the principle of removing the bottom sealing film from the dispensing passage outlet openings using a stripping member can be applied by doing away with the foot portion of the column of the cartridge, such that the dispensing aperture is provided in or near the bottom of the cartridge, and providing the cartridge with a circumferential wall extending below the bottom of the cartridge, providing a sealing surface for the periphery of the bottom sealing film at a distance from the bottom of the cartridge. In this design, when an O-shaped bottom sealing film is used, the bottom sealing film also has a conical shape. However, the top of the imaginary cone defined by the bottom sealing film now points towards the top of the cartridge instead of away from the cartridge, as is the case with the previous described embodiment, i.e. the column of the cartridge having a foot portion.

The stripping member is for example embodied as a stripping ring, preferably concentric with the dispensing aperture. In an alternative embodiment, the stripping member comprise multiple discrete stripping bodies which engage the bottom sealing film between its hole and its periphery at regular intervals around the dispensing aperture.

In an embodiment, the stripping member is disc shaped, having an outer diameter similar to the outer diameter of the outer cartridge body, and an central opening having a diameter large enough for receiving the foot portion of the column with—part of—the stripped bottom sealing film around said column. In a further embodiment, the stripping member forms the bottom of the holder.

It will be appreciated by the skilled person that a technical feature discussed herein as required or as optional with respect to one embodiment of the invention may be equally applicable to one or more other embodiments described herein, with the feature performing its designation function. Such combinations are all envisaged herein unless a combination would result in a technical impossible solution and/or not meet the desired functionality.

The invention claimed is:

1. A disposable cartridge filled with a single serve portion of a liquid ingredient to be combined with a base liquid for the preparation of a liquid food product suitable for human consumption, the disposable cartridge comprising:
   a cartridge body with a bottom and a top, and a top side and a bottom side, the body delimiting a reservoir that is filled with a single serve portion of a liquid ingredient,
   wherein the top has an aperture in communication with said reservoir, which aperture is hermetically sealed by a top sealing film,
   wherein the cartridge body further comprises a column having a portion that projects upwards from the bottom to a top end of the column,
   wherein a channel extends through the column from an inlet at said top end of the column to a dispensing aperture at a bottom end of the column, which dispensing aperture is located at the bottom side of the cartridge body,
   wherein the column has a wall having an inside surface that delimits the channel, an outside surface that delimits the reservoir, and a top surface at the top end of the column,
   wherein the top sealing film is also sealed to said top end of the column,
   wherein the bottom of the cartridge body has a flexible portion adjacent the column, such that the column is movable downwards by a force exerted thereon relative to the top of the cartridge body between a higher initial position and a lower dispensing position,
   wherein a base liquid feed lance is connectable to the inlet of the channel in the column, allowing to feed the base liquid into the channel and to dispense a stream of base liquid via the dispensing aperture, said stream having an exterior,
   wherein the cartridge body is provided with one or more dispensing passages adapted to dispense the liquid ingredient from the reservoir,
   which one or more dispensing passages have one or more dispensing passage inlet openings arranged so that liquid ingredient in the reservoir can enter the one or more dispensing passages, and which one or more dispensing passages have one or more dispensing passage outlet openings arranged so that liquid ingredient emerging therefrom merges outside the channel and external to the cartridge, with said exterior of said base liquid stream that is dispensed from die dispensing aperture at the bottom end of the column, after said base liquid stream exits the dispensing aperture, wherein the cartridge has a bottom sealing film provided with a hole, which bottom sealing film is placed against the bottom of the cartridge body such that the hole of the sealing film is aligned with the dispensing aperture of the column, the bottom sealing film being sealed to the cartridge body at the column and at one or more locations remote from the column, and which bottom sealing film is adapted to rupture and/or to tear away from the dispensing aperture due to the column being moved downwards to its lower dispensing position, thereby allowing dispensing from the passage outlet openings.

2. A disposable cartridge according to claim 1, wherein the one or more dispensing passage outlet openings are arranged around the dispensing aperture and the bottom sealing film hermetically seals the at least one or more dispensing passage outlet openings, and wherein the bottom sealing film is adapted to rupture and/or to tear away from the one or more dispensing passage outlet openings due to the column being moved downwards to its lower one or more dispensing position, thereby opening the dispensing passage outlet openings.

3. A disposable cartridge according to claim 1, wherein the portion of the column that projects upwards from the bottom of the cartridge body to the top end of the column is an upper portion of the column, and wherein the column wall further has a lower foot portion, which foot portion projects downwards from the bottom of the cartridge body to said bottom end of the column, such that the bottom surface of the wall of the column and the dispensing aperture at the bottom end of the column is spaced from the bottom of the cartridge body.

4. A disposable cartridge according to claim 1, wherein the one or more dispensing passages are arranged in the outside surface of the wall of the column, and wherein the one or more dispensing passage outlet openings are provided in a bottom surface of the wall of the column.

5. A disposable cartridge according to claim 3, wherein the one or more dispensing passages are at least partially arranged in the bottom of the cartridge body and wherein the one or more dispensing passage outlet openings are arranged in the bottom of the cartridge body; adjacent to the foot portion of the column, so that liquid ingredient emerging from said one or more dispensing passage outlet openings contacts an outside surface of the wall of the foot portion of the column, and flows over the outside surface of the wall of the column to merge with said exterior of said base liquid stream emerging from the dispensing aperture at the bottom end of the column.

6. A disposable cartridge according to claim 3, wherein the one or more dispensing passages are arranged in the outside surface of the wall of the column, and wherein the one or more dispensing passage outlet openings are provided in an outside surface of the wall of the foot portion of the column, between the bottom of the cartridge body and the bottom end of the column, so that liquid ingredient emerging from said one or more dispensing passage outlet openings flows over the outside surface of the wall of the column to merge with said exterior of said base liquid stream emerging from the dispensing aperture at the bottom end of the column.

7. A disposable cartridge according to claim 3, wherein the foot portion of the column has a first portion adjacent the bottom of the cartridge body with a first diameter and an adjoining second portion with a second diameter smaller than said first diameter, which first and second foot portion are separated by a shoulder, wherein the one or more dispensing passages are arranged in the outside surface of the wall of the column, and wherein the dispensing passage outlet openings are provided in the shoulder, so that liquid ingredient emerging from said one or more dispensing passage outlet openings flows over the outside surface of the wall of the lower foot portion to merge with a base liquid stream emerging from the dispensing aperture at the bottom end of the column.

8. A disposable cartridge according to claim 3, wherein one or more discharge grooves are provided in an outside surface of the foot portion of the column wall for guiding the liquid ingredient emerged from the one or more dispensing passage outlet openings, each discharge groove extending from a dispensing passage outlet openings towards the bottom end of the column.

9. A disposable cartridge according to claim 1, wherein the bottom sealing film has an inner loop shaped sealing area, which is sealed around the dispensing aperture, and an outer loop shaped sealing area, which is sealed to the cartridge body remote from the one or more dispensing passage outlet openings.

10. A disposable cartridge according to claim 1, wherein the top sealing film is pierceable so as to allow for introduction of a pressurized gas into the reservoir in order to pressurize the liquid ingredient therein so as to assist dispensing thereof via the one or more dispensing passages.

11. A disposable cartridge according to claim 10, wherein the cartridge body comprises one or more top sealing film piercing members which are arranged in the reservoir underneath the top sealing film, which seal piercing members have a cutting top positioned near the top seal for, when the top sealing film is moved downwards engaging the top sealing film and locally rupture the top sealing film thereby providing one or more holes that allow for introduction of pressurized gas into the reservoir.

12. A disposable cartridge according to claim 11, wherein a piercing member has a bottom end integral with the bottom of the cartridge and a body extending from the bottom upwards through the reservoir to the cutting top located near the top seal, and optionally has a side integral with the circumferential wall of the reservoir.

13. A disposable cartridge according to claim 1, wherein the combined area of the one or more dispensing passage outlet openings is multiple times larger than the combined area of the one or more dispensing passage inlet openings.

14. A disposable cartridge according to claim 1, wherein the one or more dispensing passage inlet opening is oriented at an angle relative to an adjoining section of the respective dispensing passage such that a jet of liquid ingredient passing through the inlet opening collides against a wall portion of the passage thereby reducing the speed of said jet.

15. A disposable cartridge according to claim 1, wherein the one or more dispensing passages are provided with a narrower inflow section compared to a wider outflow section, such that the narrow inflow section forms a restriction for a flow of liquid ingredient that flows form the reservoir to the one or more dispensing passage outlet openings.

16. A disposable cartridge according to claim 15, wherein the outflow section extends substantially parallel to the channel in the column and the inlet section extends at an angle to the outflow section, such that a jet of liquid ingredient passing through the inlet opening, collides against a wall portion of the outflow section, thereby reducing the speed of said jet.

17. A disposable cartridge according to claim 1, wherein the cartridge body has a circumferential wall having an upper rim bounding an opening, wherein the top sealing film is fixed to said upper rim.

18. A disposable cartridge according to claim 1, wherein the cartridge body has a circumferential wall around the perimeter of the bottom and wherein the channel is concentric relative to an axis of the circumferential wall of the cartridge.

19. A disposable cartridge according to claim 1, wherein a valve member is arranged within the reservoir of the cartridge and outside of the column, which valve member is stationary arranged within the cartridge so as to be movable relative to the column when the column is moved from its higher initial position to its lower dispensing position,
  wherein in the higher initial position of the column, the valve member closes the one or more dispensing passages, such that the reservoir is closed, and
  wherein in the lower dispensing position of the column, the valve member has moved away from the one or more dispensing passages, such that the reservoir is opened.

* * * * *